(12) United States Patent
Alexander

(10) Patent No.: US 8,295,069 B2
(45) Date of Patent: Oct. 23, 2012

(54) POWER CONVERSION WITH ADDED PSEUDO-PHASE

(75) Inventor: William C. Alexander, Spicewood, TX (US)

(73) Assignee: Ideal Power Converters, Inc., Spicawood, TX (US)

( * ) Notice: Subject to any disclaimer, the term of this patent is extended or adjusted under 35 U.S.C. 154(b) by 0 days.

(21) Appl. No.: 13/205,225

(22) Filed: Aug. 8, 2011

(65) Prior Publication Data

US 2012/0014151 A1    Jan. 19, 2012

Related U.S. Application Data

(63) Continuation of application No. PCT/US2010/045819, filed on Aug. 17, 2010.

(60) Provisional application No. 61/234,373, filed on Aug. 17, 2009.

(51) Int. Cl.
*H02M 7/5387* (2007.01)

(52) U.S. Cl. ........................................................ 363/132

(58) Field of Classification Search .................... 363/16, 363/17, 34, 36, 37, 97, 98, 131, 132
See application file for complete search history.

(56) References Cited

U.S. PATENT DOCUMENTS

| | | | |
|---|---|---|---|
| 4,616,300 A | 10/1986 | Santelmann, Jr. | |
| 5,208,740 A | 5/1993 | Ehsani | |
| 5,363,020 A | 11/1994 | Chen et al. | |
| 5,500,791 A | 3/1996 | Kheraluwala et al. | |
| 5,903,448 A | 5/1999 | Davila, Jr. | |
| 5,977,569 A | 11/1999 | Li | |
| 6,330,170 B1 | 12/2001 | Wang et al. | |
| 6,370,050 B1 | 4/2002 | Peng | |
| 6,404,654 B1 | 6/2002 | Wang | |
| 6,567,278 B2 * | 5/2003 | Rufer et al. | 363/17 |
| 6,984,965 B2 | 1/2006 | Viniciarelli | |
| 7,057,905 B2 | 6/2006 | Macmillan | |
| 7,760,517 B2 * | 7/2010 | Herty et al. | 363/17 |
| 8,149,596 B2 * | 4/2012 | Lee et al. | 363/17 |
| 2006/0103341 A1 | 5/2006 | Steigerwald et al. | |
| 2008/0013351 A1 | 1/2008 | Alexander | |
| 2008/0031019 A1 | 2/2008 | Alexander | |
| 2011/0012579 A1 * | 1/2011 | Huang | 323/304 |

FOREIGN PATENT DOCUMENTS

WO    WO2008/008143 A3    1/2008

OTHER PUBLICATIONS

Ehsani et al, "Inverse Dual Converter (IDC) for High-Power DC-DC Applications", IEEE Transactions on Power Electronics, vol. 8, No. 2, Apr. 1993, pp. 216-223.
Kheraluwala, et al., "Performance Characterization of a High-Power Dual Active Bridge dc-to-dc Converter", IEEE Transactions on Industry Applications, vol. 28, No. 6, Nov./Dec. 1992, pp. 1294-1301.

(Continued)

*Primary Examiner* — Matthew Nguyen
(74) *Attorney, Agent, or Firm* — Robert O. Groover, III

(57) ABSTRACT

Methods and systems for power conversion. An energy storage capacitor is contained within an H-bridge subcircuit which allows the capacitor to be connected to the link inductor of a Universal Power Converter with reversible polarity. This provides a "pseudo-phase" drive capability which expands the capabilities of the converter to compensate for zero-crossings in a single-phase power supply.

20 Claims, 44 Drawing Sheets

Single Phase to Three Phase

OTHER PUBLICATIONS

K. Ngo, "Topology and Analysis in PWM Inversion, Rectification, and Cycloconversion", Dissertation, California Institute of Technology (1984).

Kim, et al., "New Bilateral Zero Voltage Switching AC/AC Converter Using High Frequency Partial-resonant Link", Korea Advanced Institute of Science and Technology, (IEEE 1990).

Rajashekara et al., "Power Electronics", Chapter 30 in the Electrical Engineering Handbook (ed. R. Dorf 2000).

http://en.wikipedia.org/wiki/Push-Pull_Converter.

International Searching Authority, International Application No. PCT/US2007/013552, International Search Report and the Written Opinion, May 19, 2008.

* cited by examiner

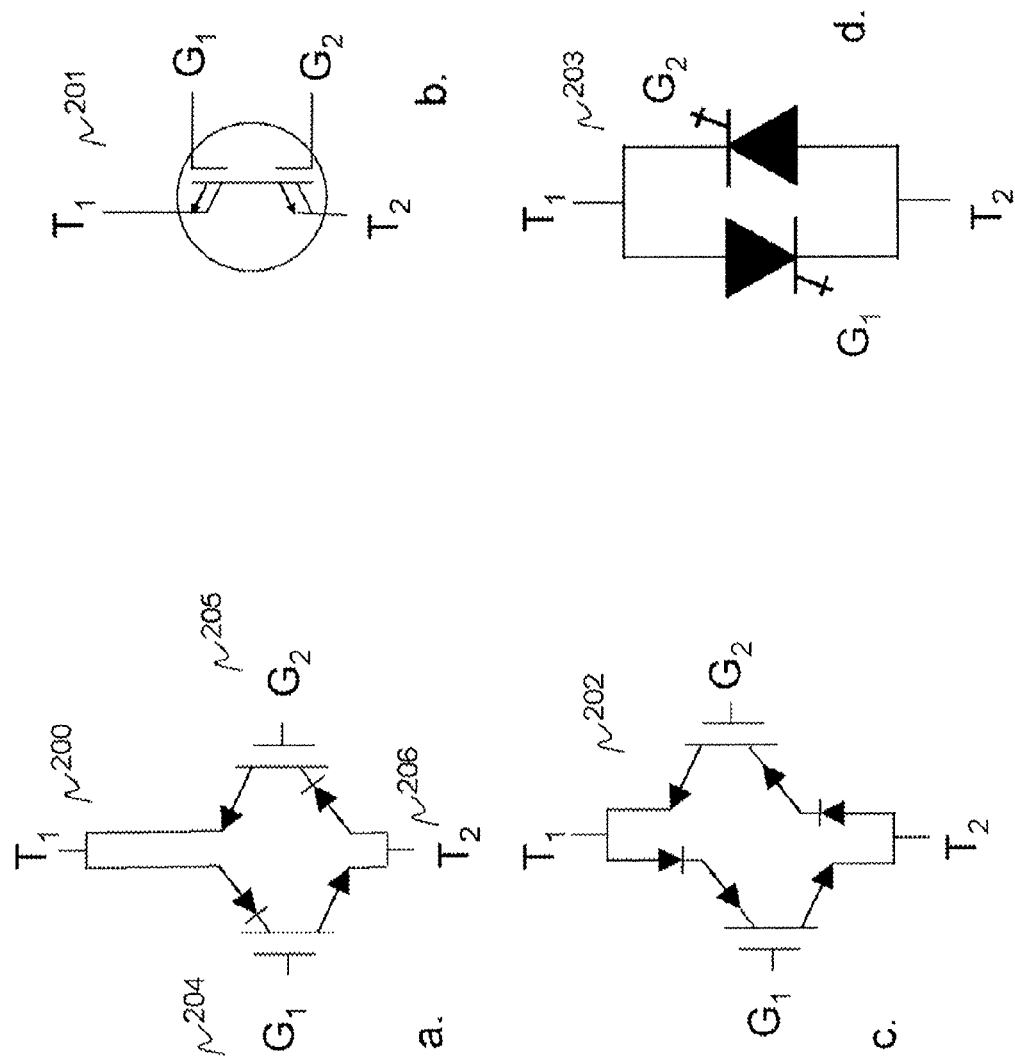
Figure 2 – AC Switch Versions

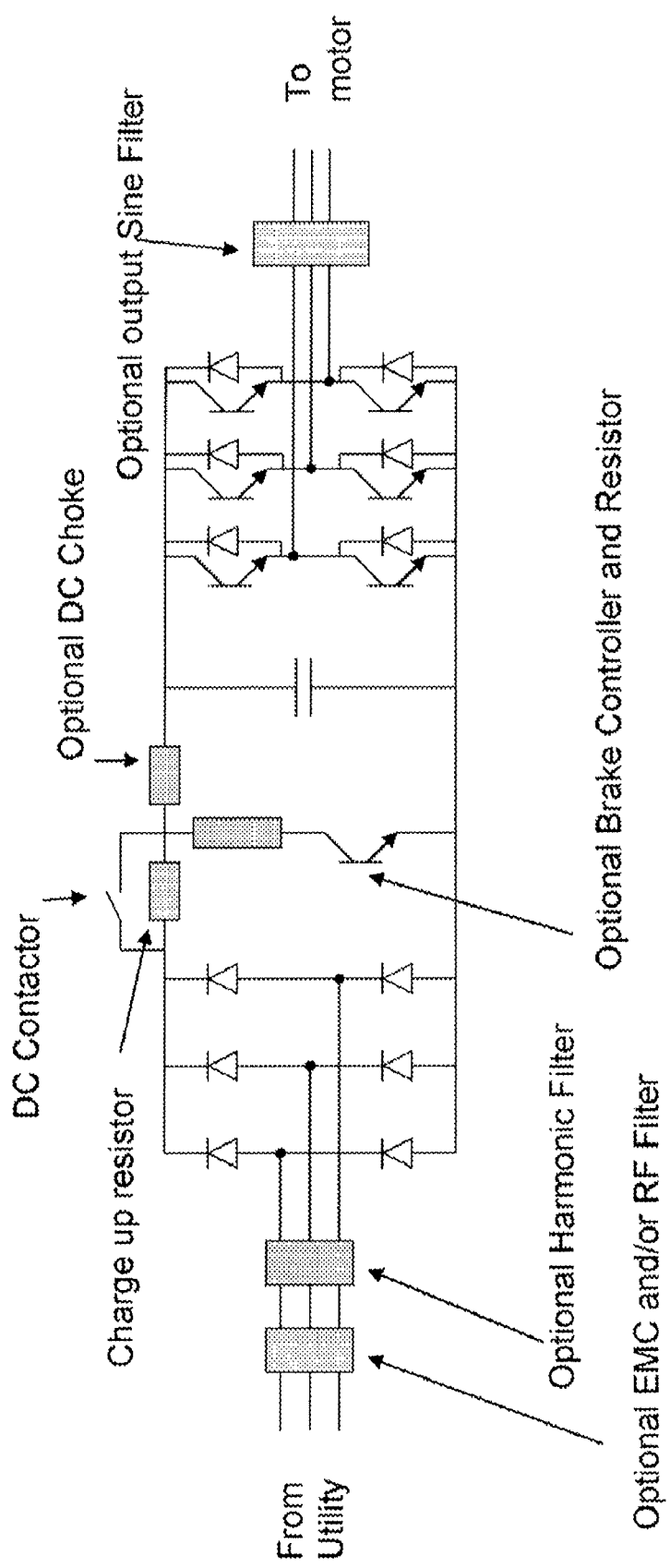
Figure 3 – Prior Art - "Standard Drive" Voltage Sourced PWM Drive

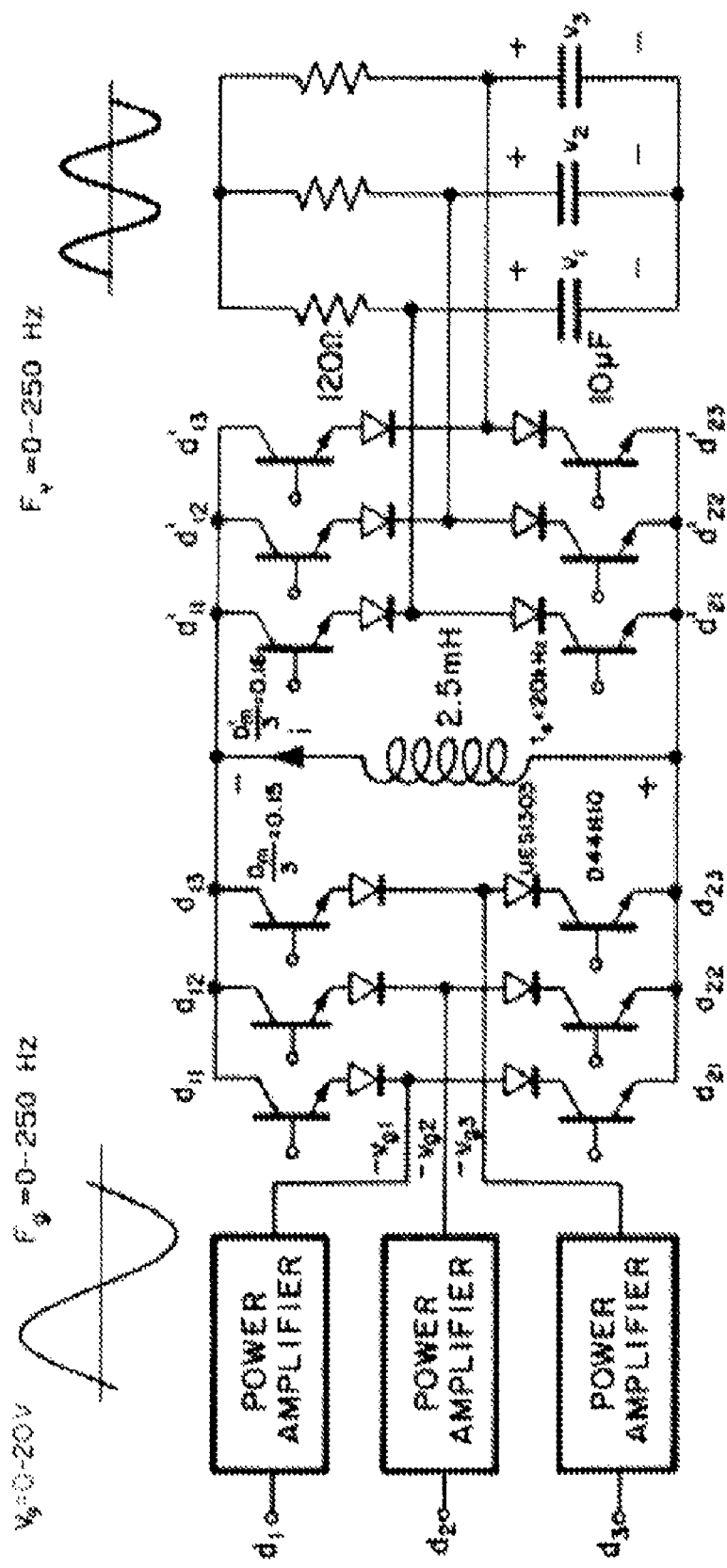
Figure 4 - Prior Art — Figure 10.7 of Reference 1

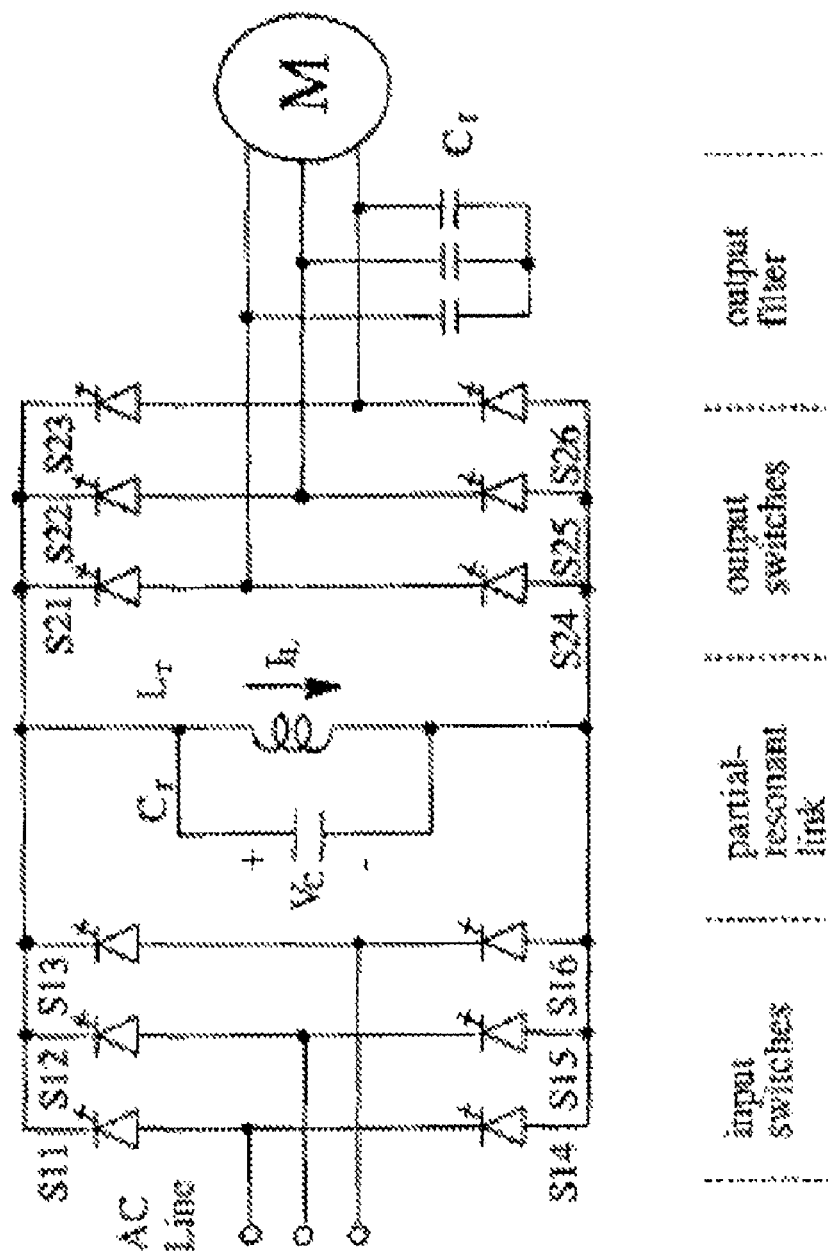
Figure 5 - Prior Art – Figure 1 of Reference 2

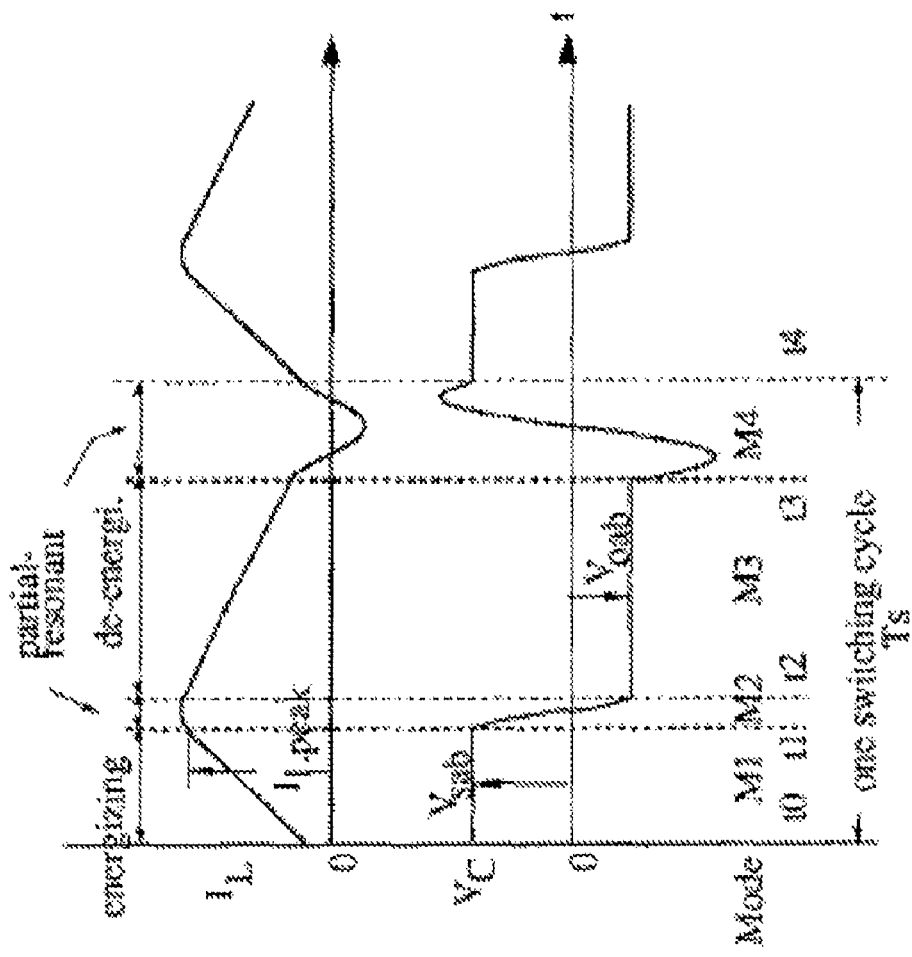
Figure 6 – Prior Art – Figure 2 of Reference 2

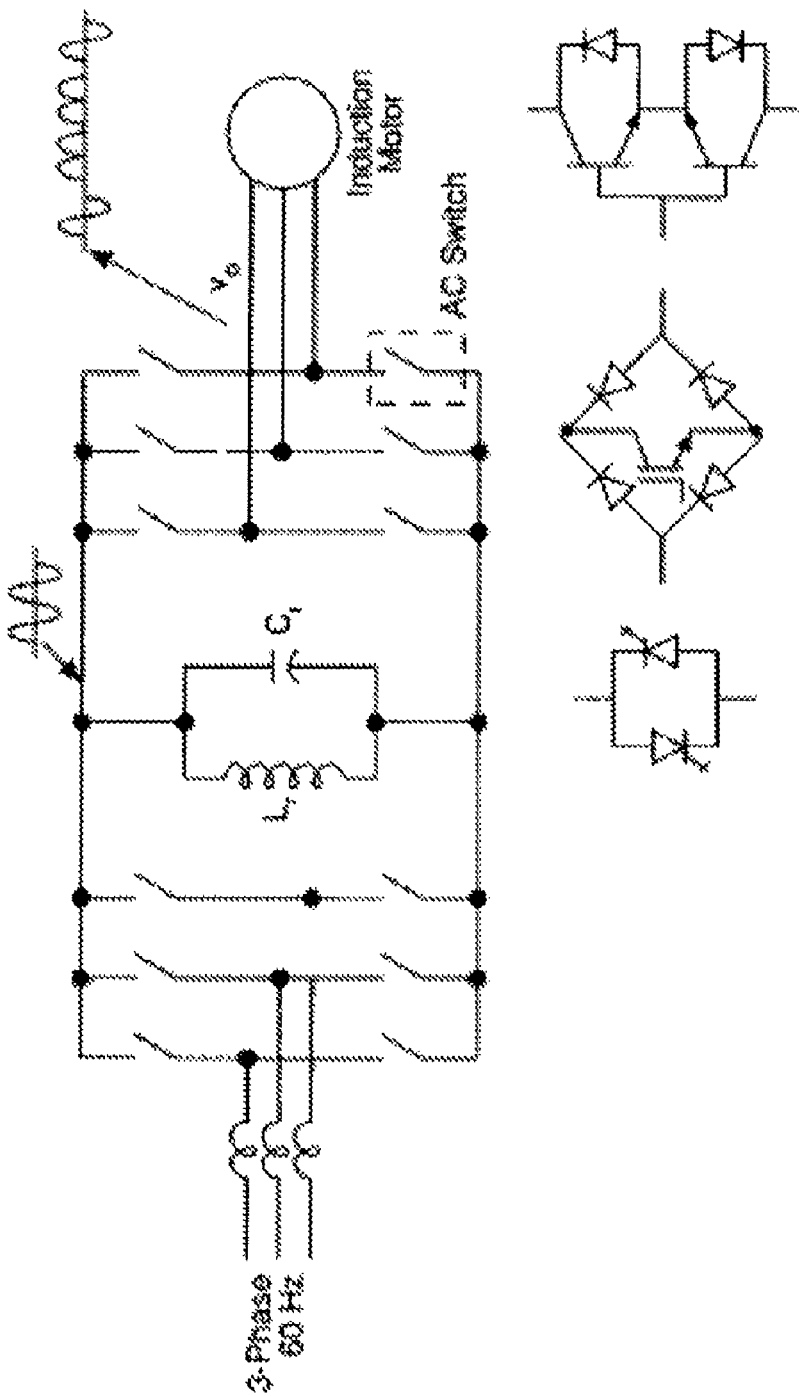
Figure 7 - Prior Art – Figure 30.16 of Reference 3

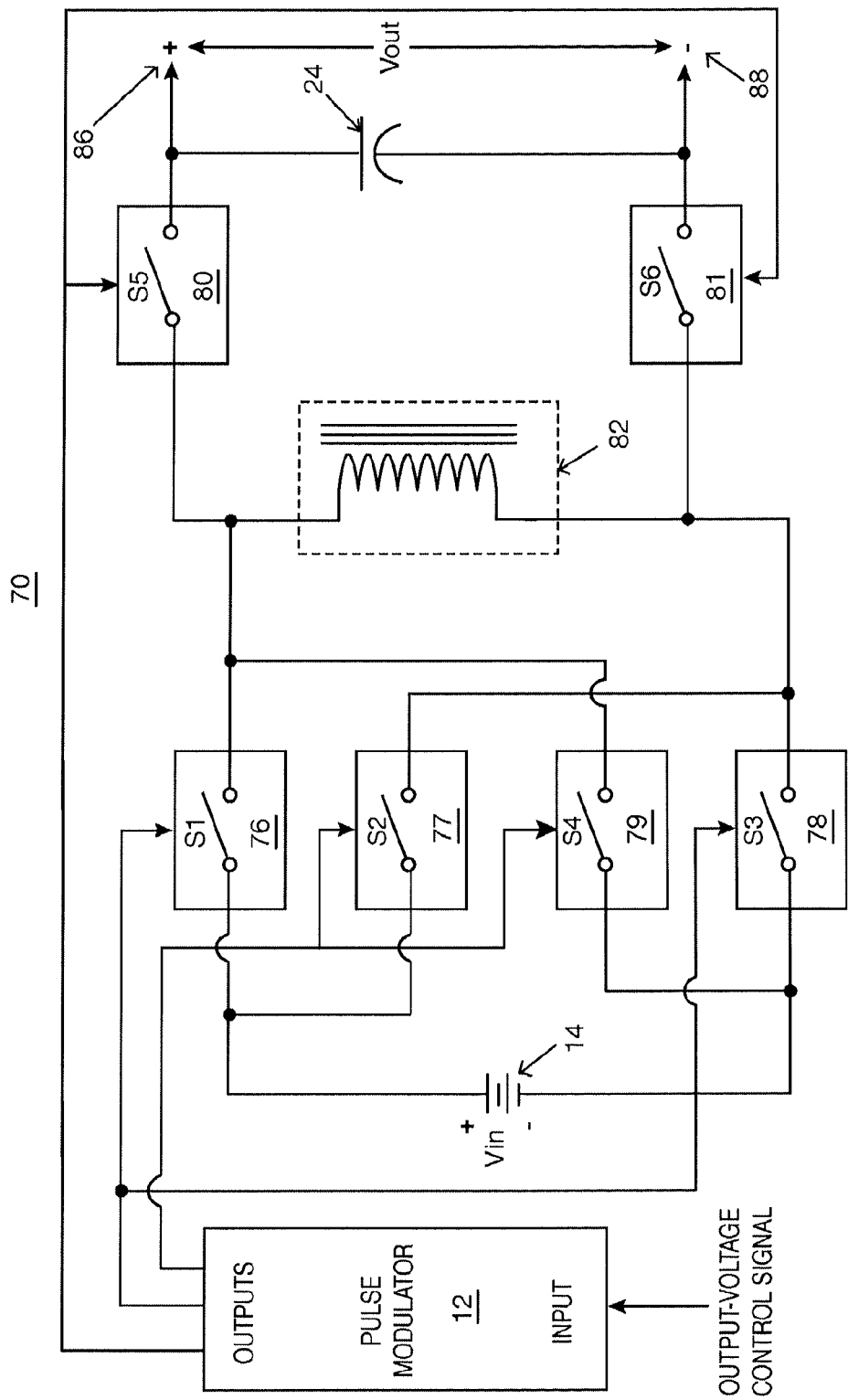
FIG. 8 – Prior Art – US 7,057,905

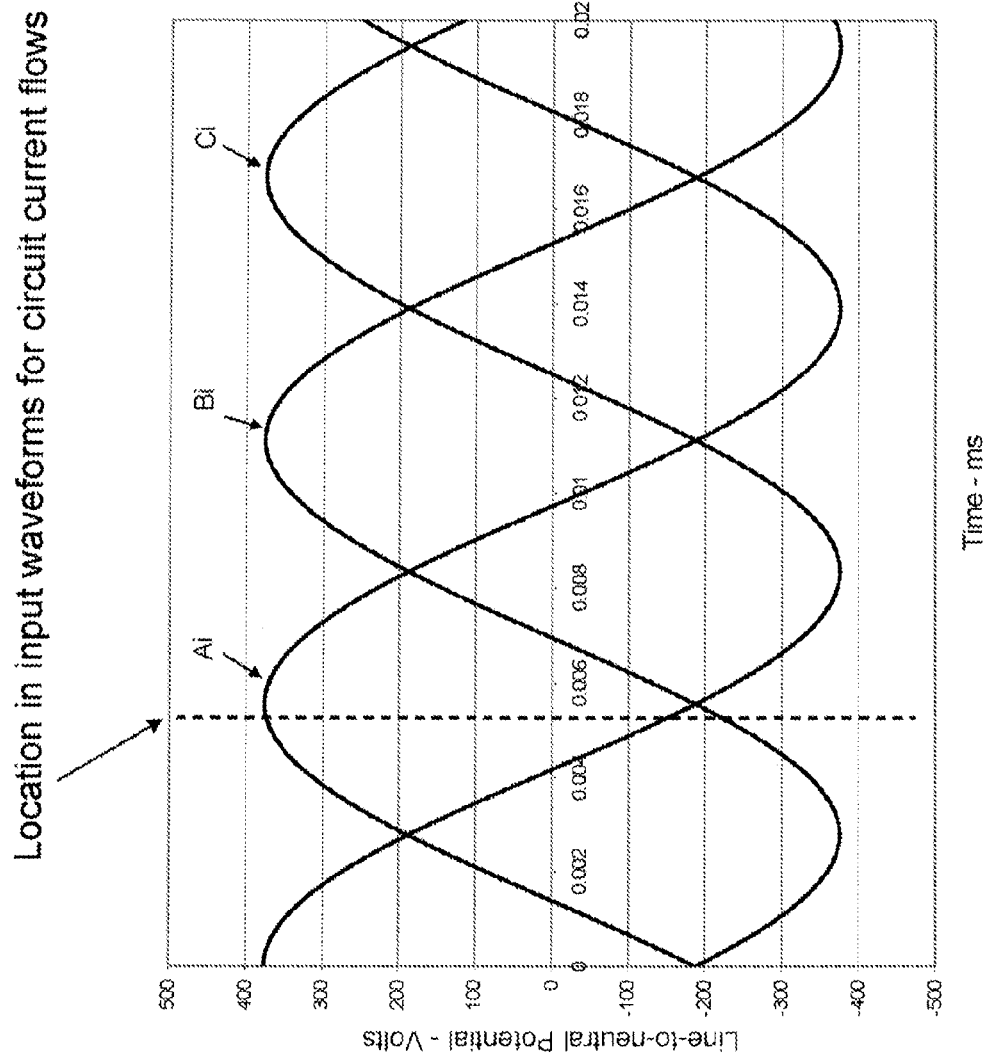
Figure 9 - Input Voltages for Current Flow example of Figs 11,12 & 13

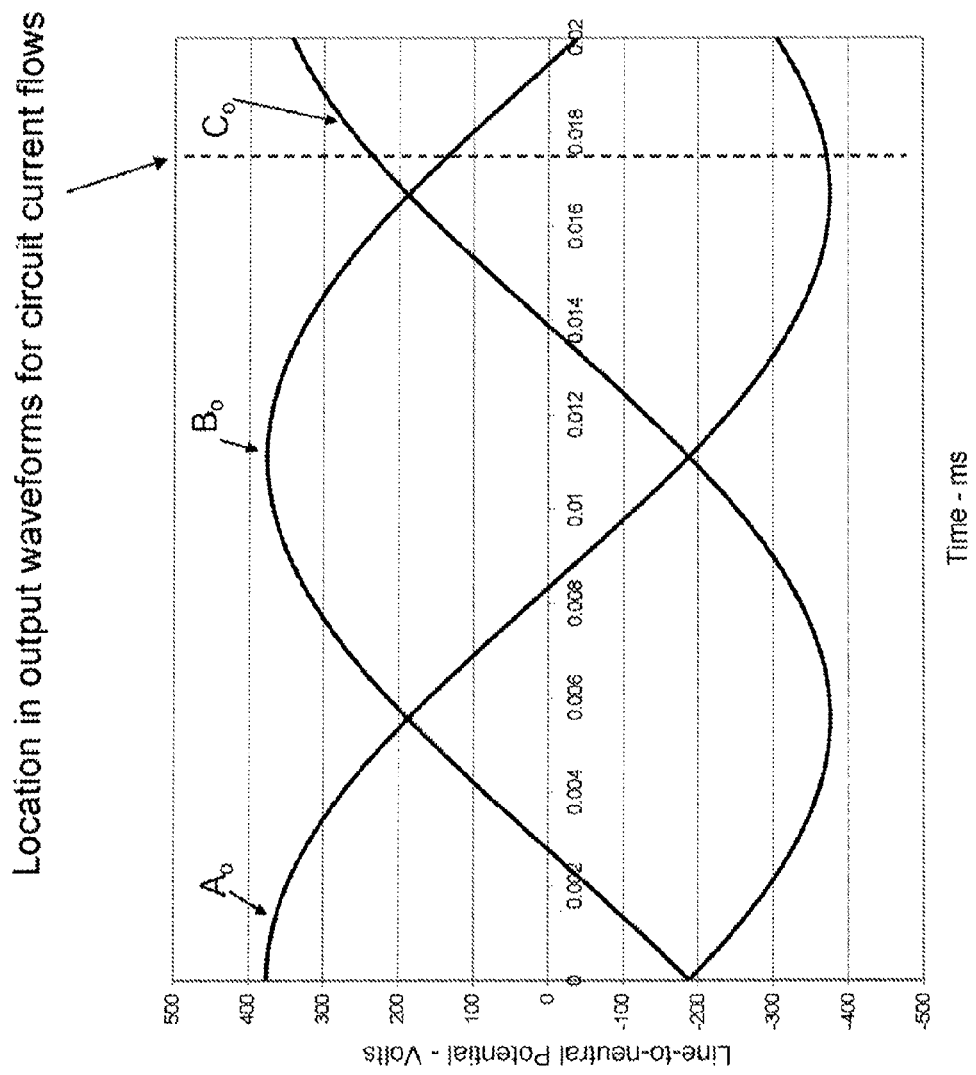
Figure 10 - Output Voltages for Current Flow example of Figs 11,12, &13

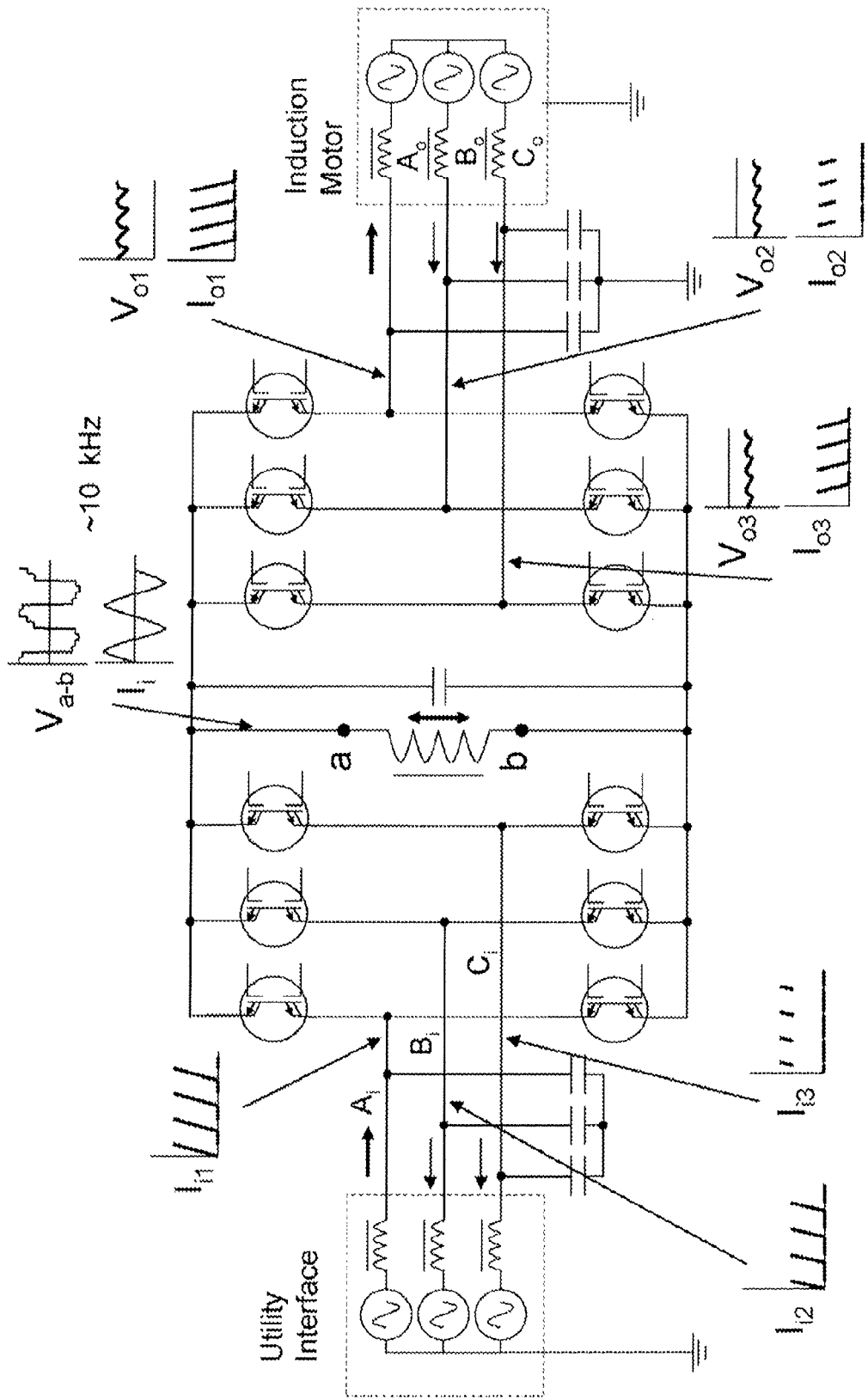
Figure 11 – Summary of Current Waveforms

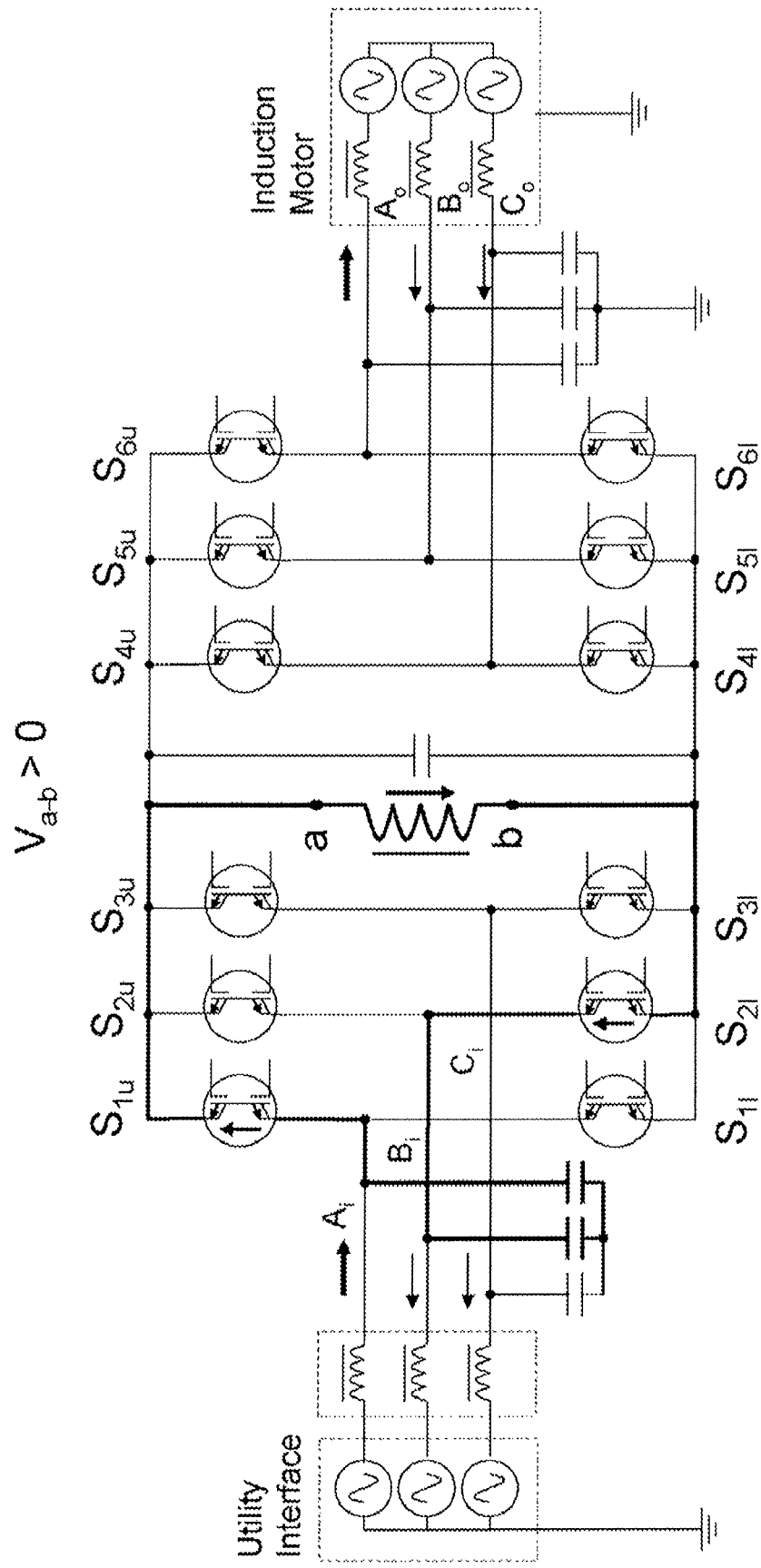
Figure 12a – Current Switching – Mode 1 of 8

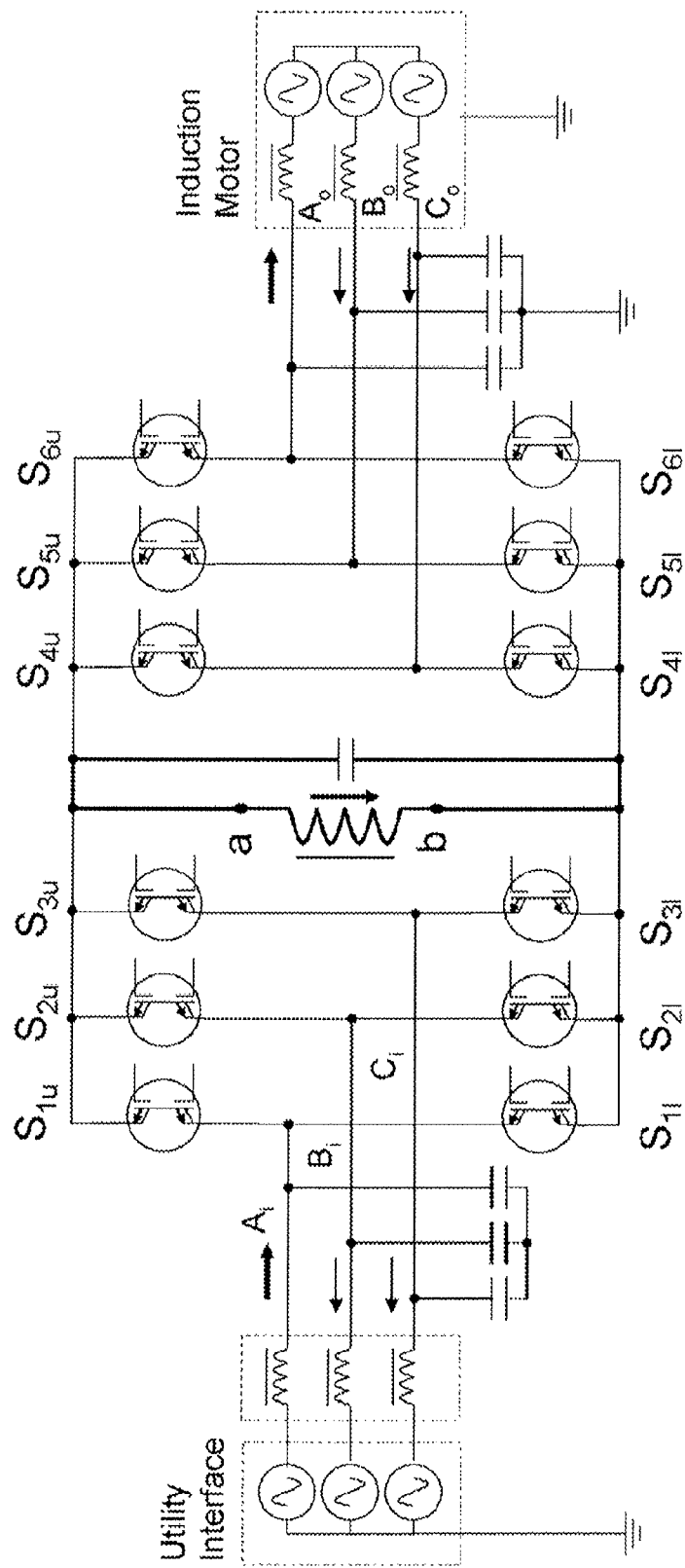
Figure 12b – Voltage Ramping – Between each of Modes 1 - 5

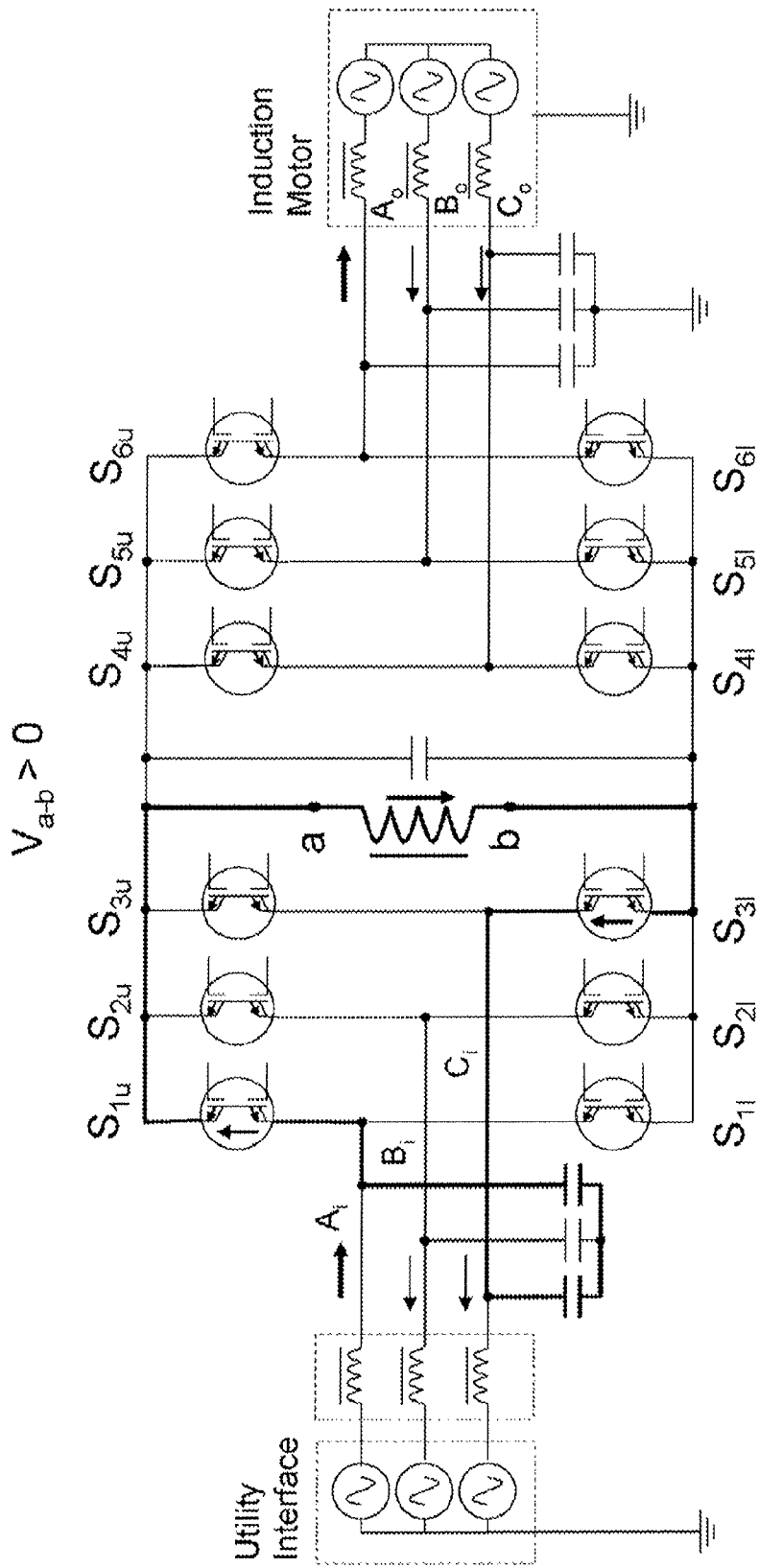
Figure 12c – Current Switching – Mode 2 of 8

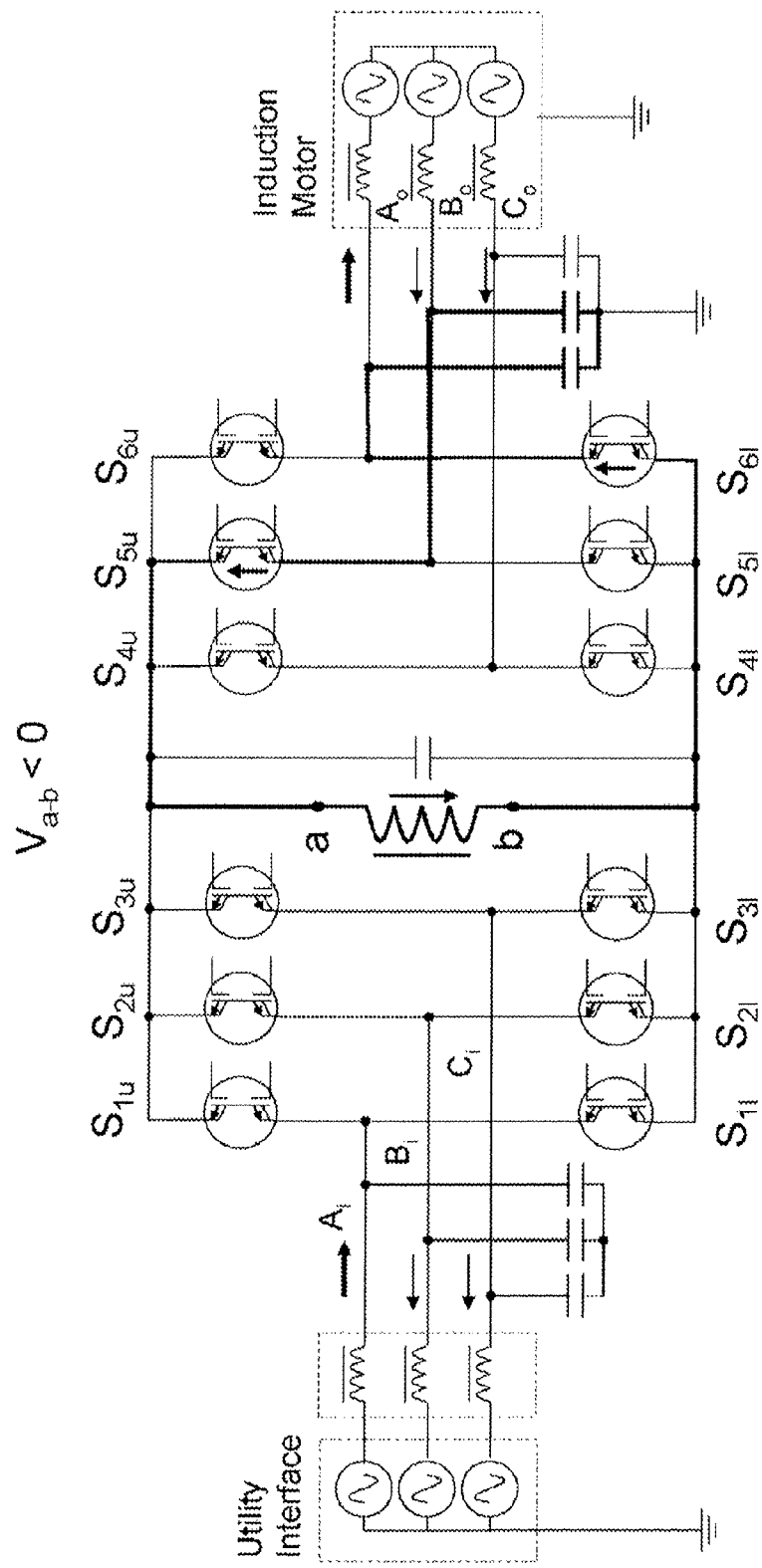
Figure 12d – Current Switching – Mode 3 of 8

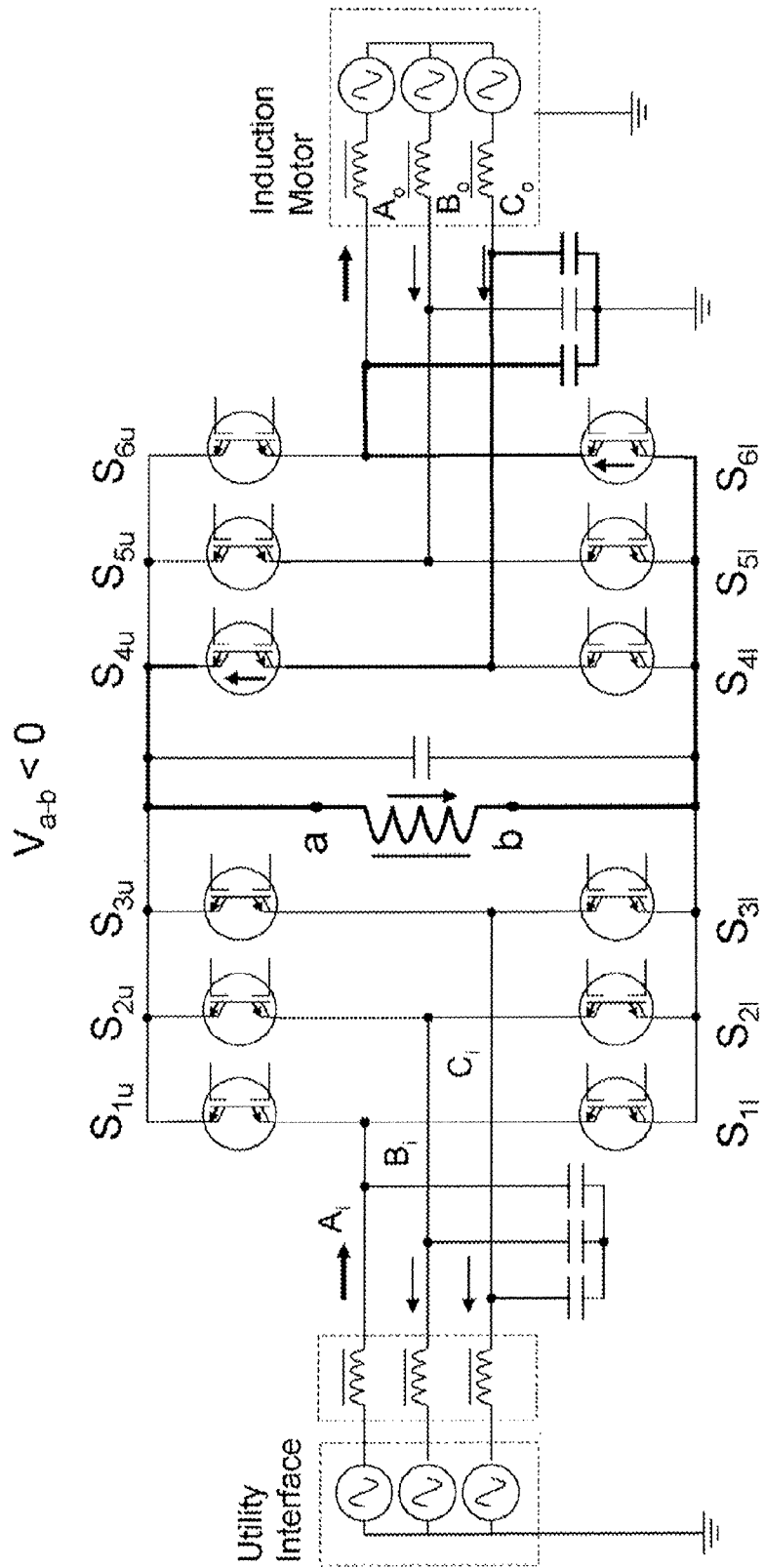
Figure 12e – Current Switching – Mode 4 of 8

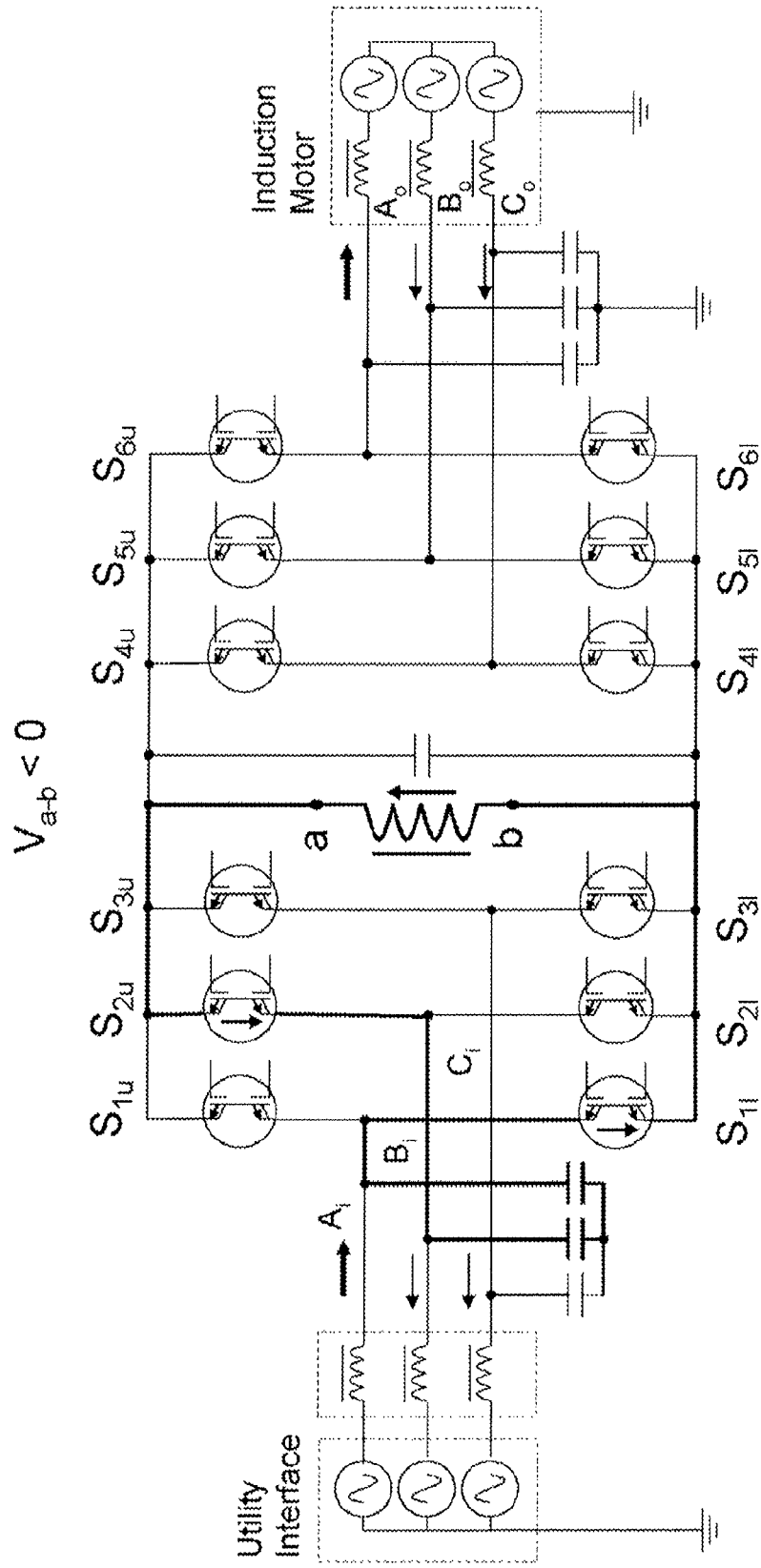
Figure 12f – Current Switching – Mode 5 of 8

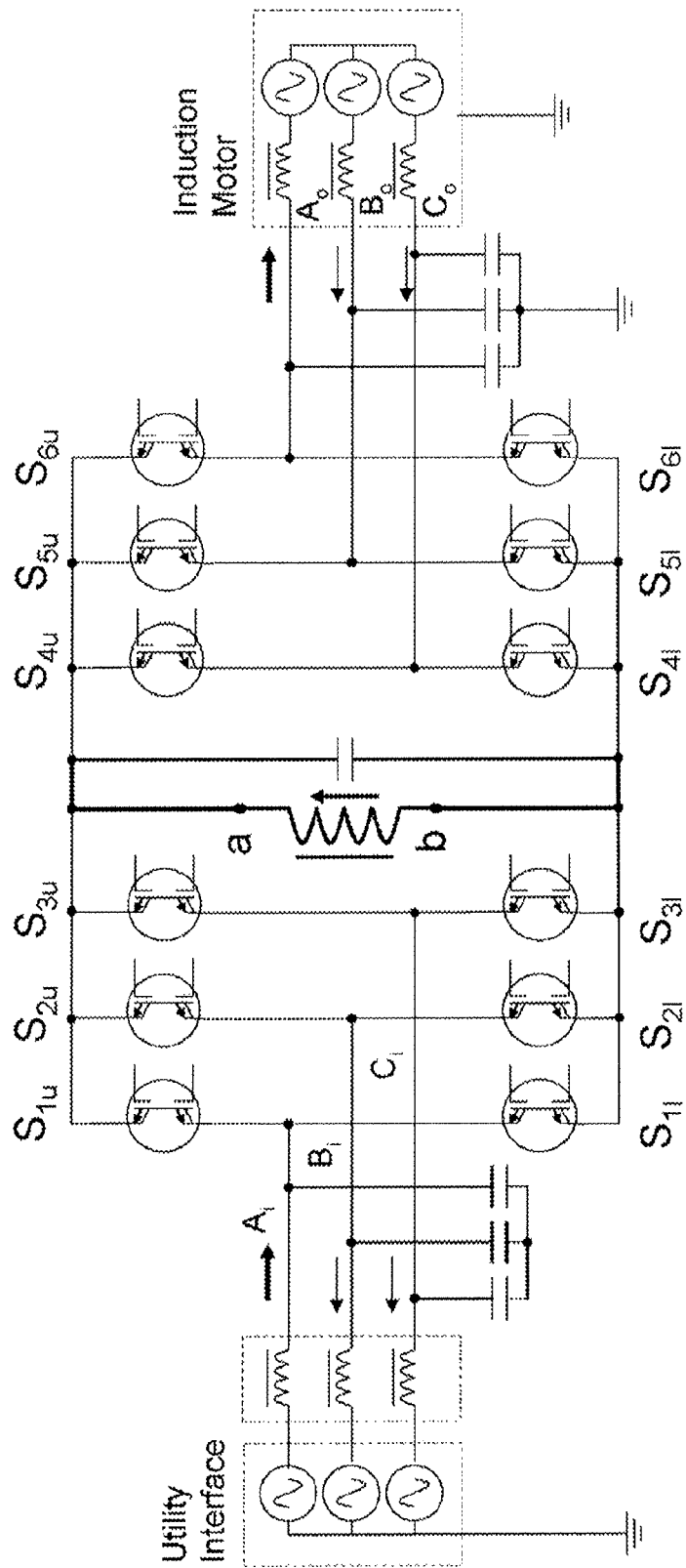
Figure 12g – Capacitor Ramping – Between each of Modes 5 - 1

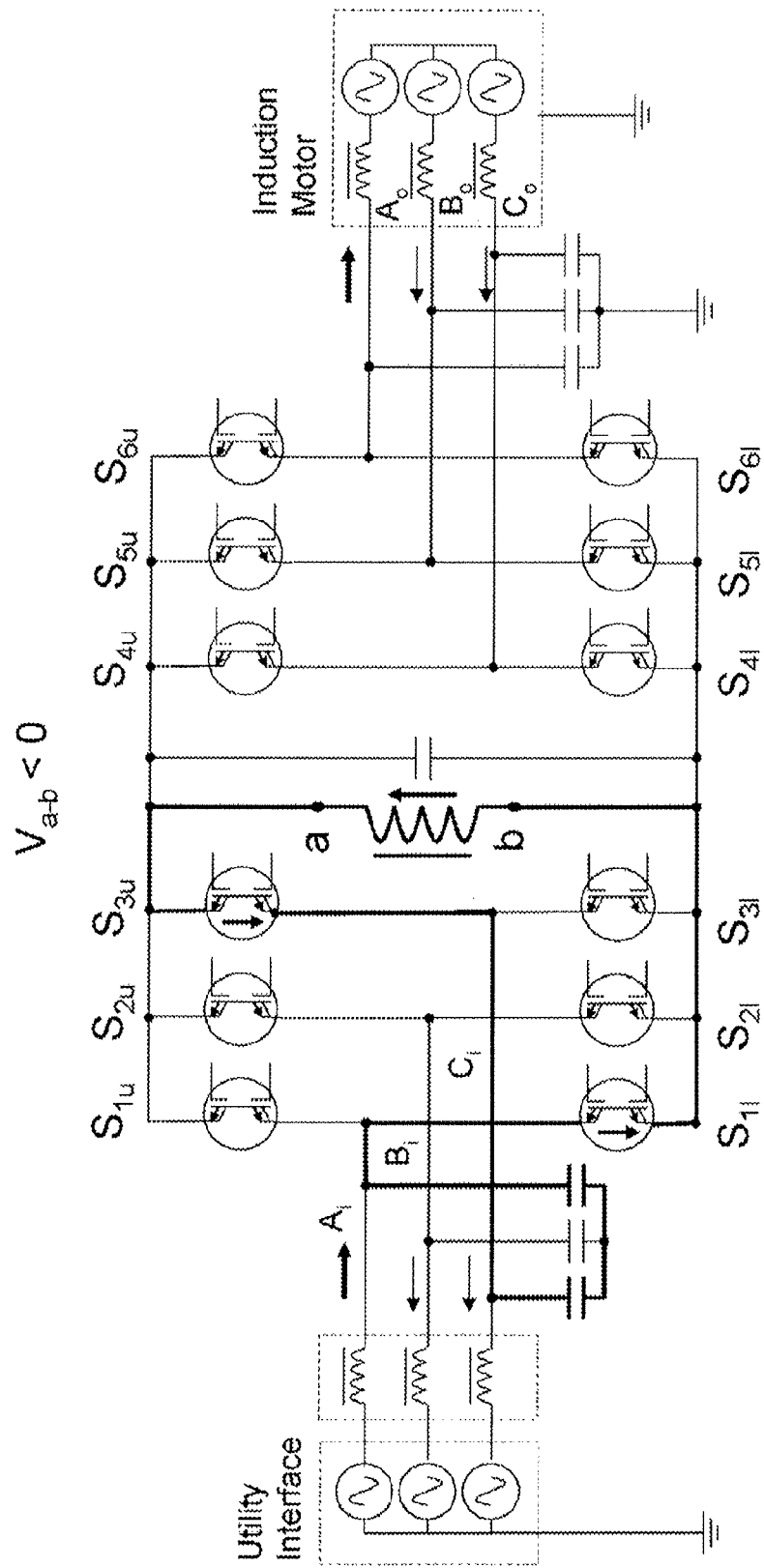
Figure 12h – Current Switching – Mode 6 of 8

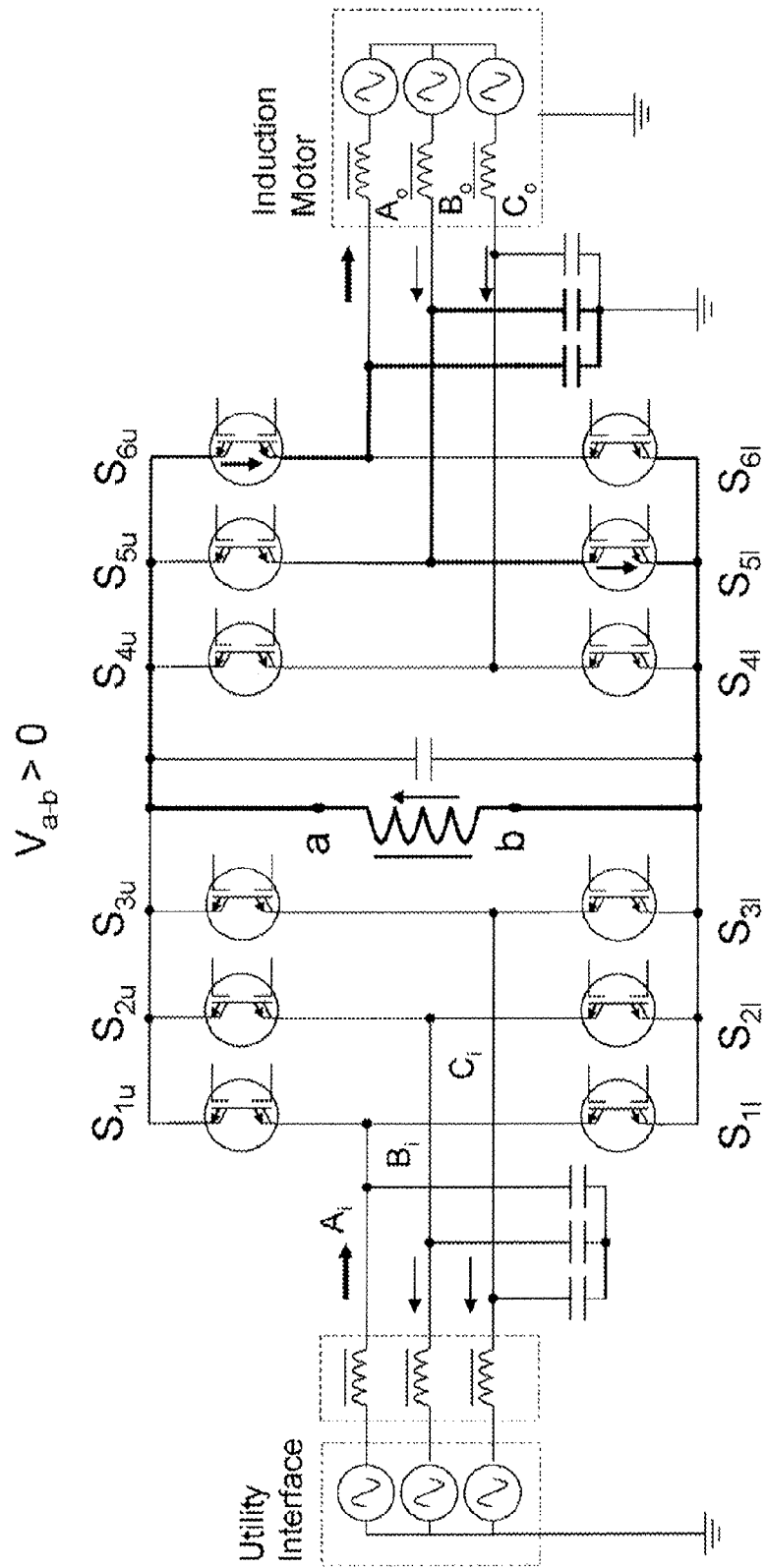
Figure 12i – Current Switching – Mode 7 of 8

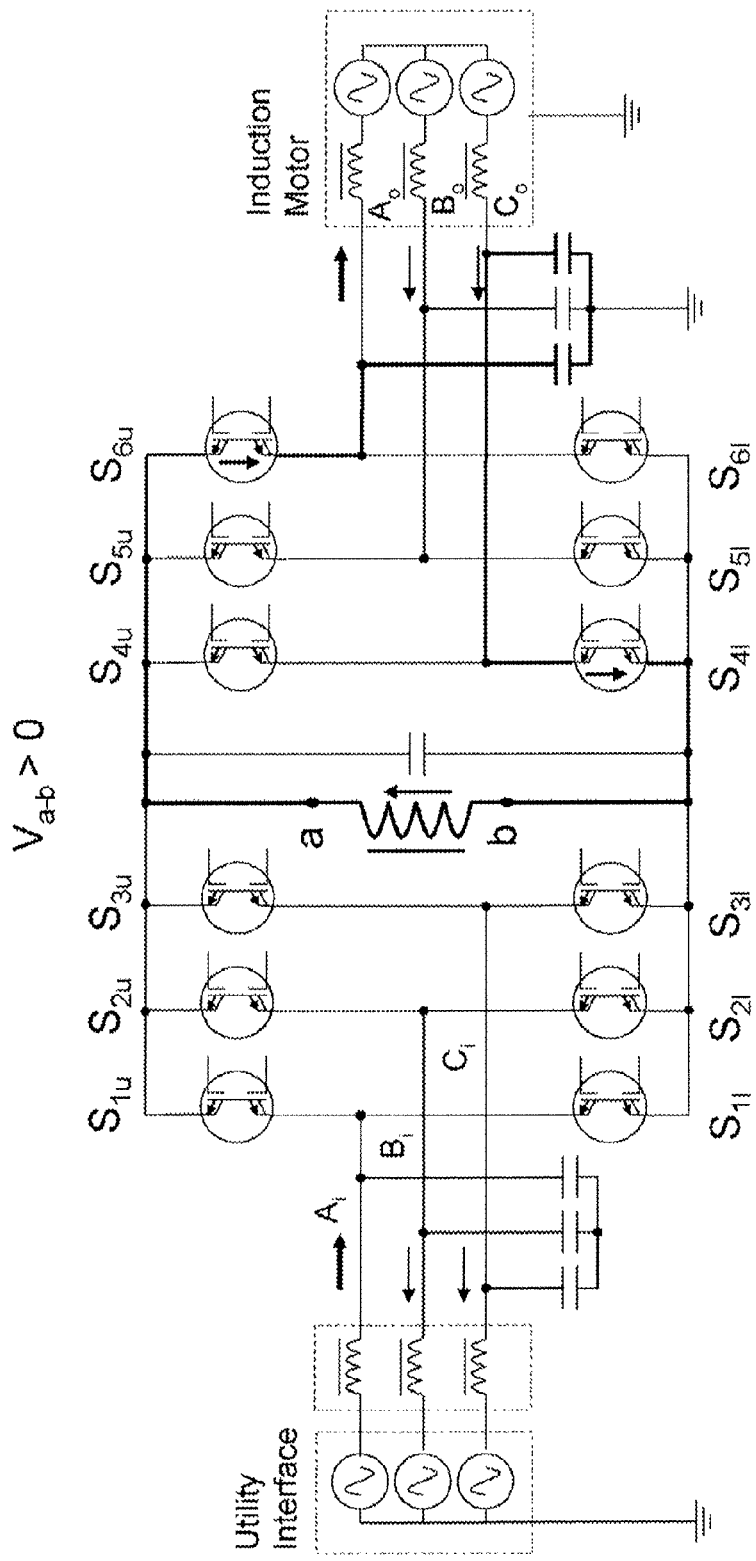
Figure 12j – Current Switching – Mode 8 of 8

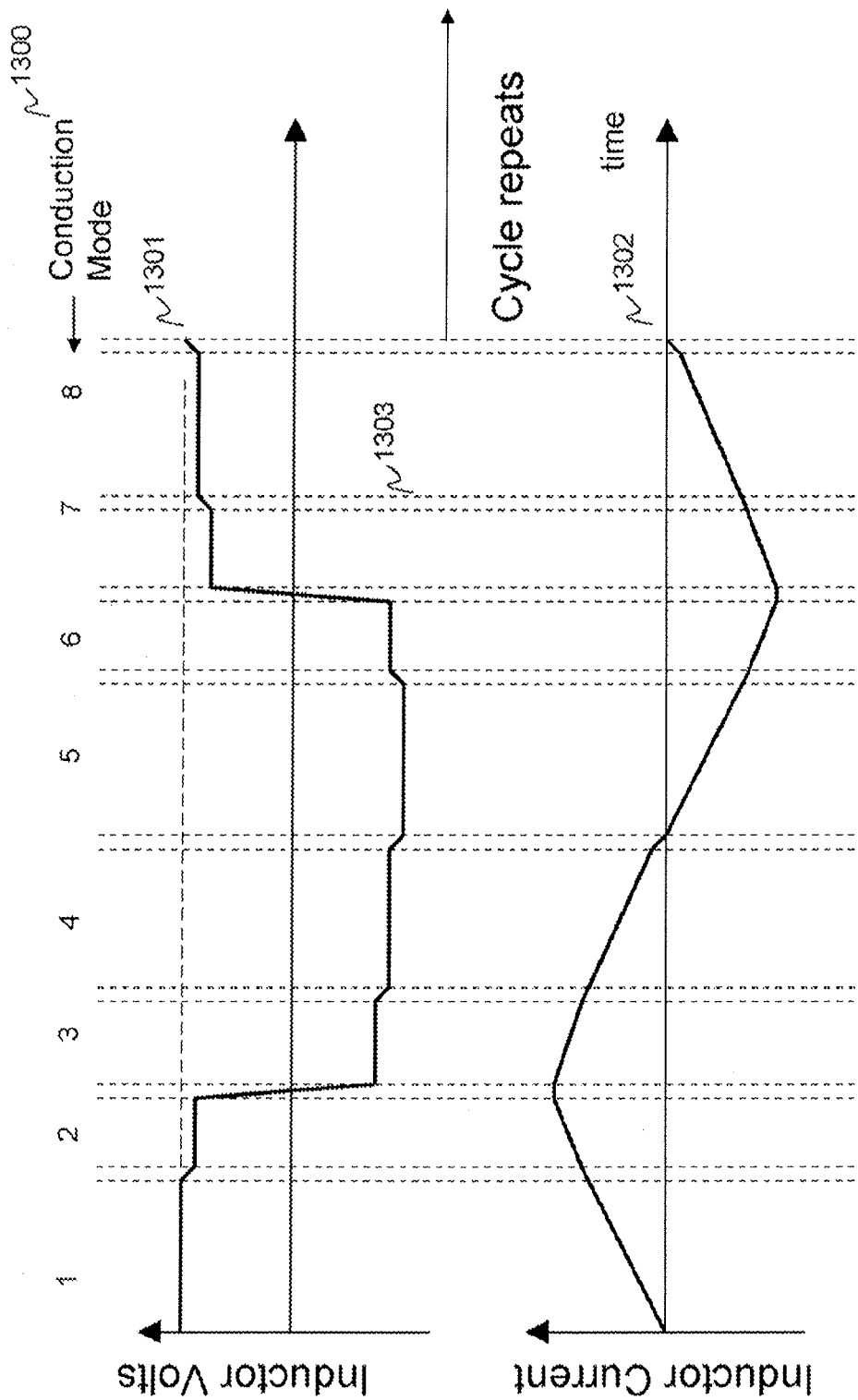
Figure 13 – For Figure 12 – Vout is slightly less than Vin

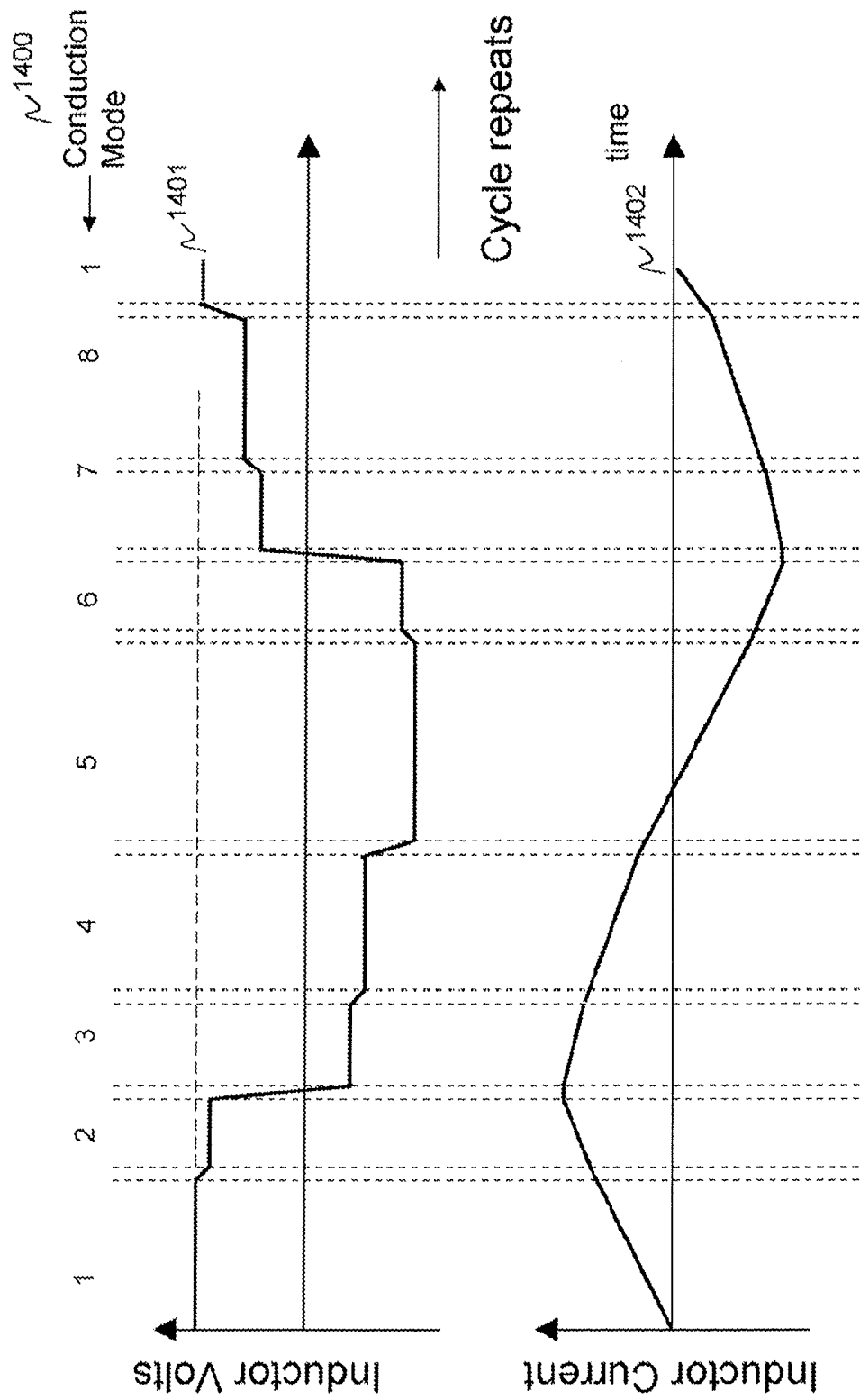
Figure 14 – Vout is ½ of Vin

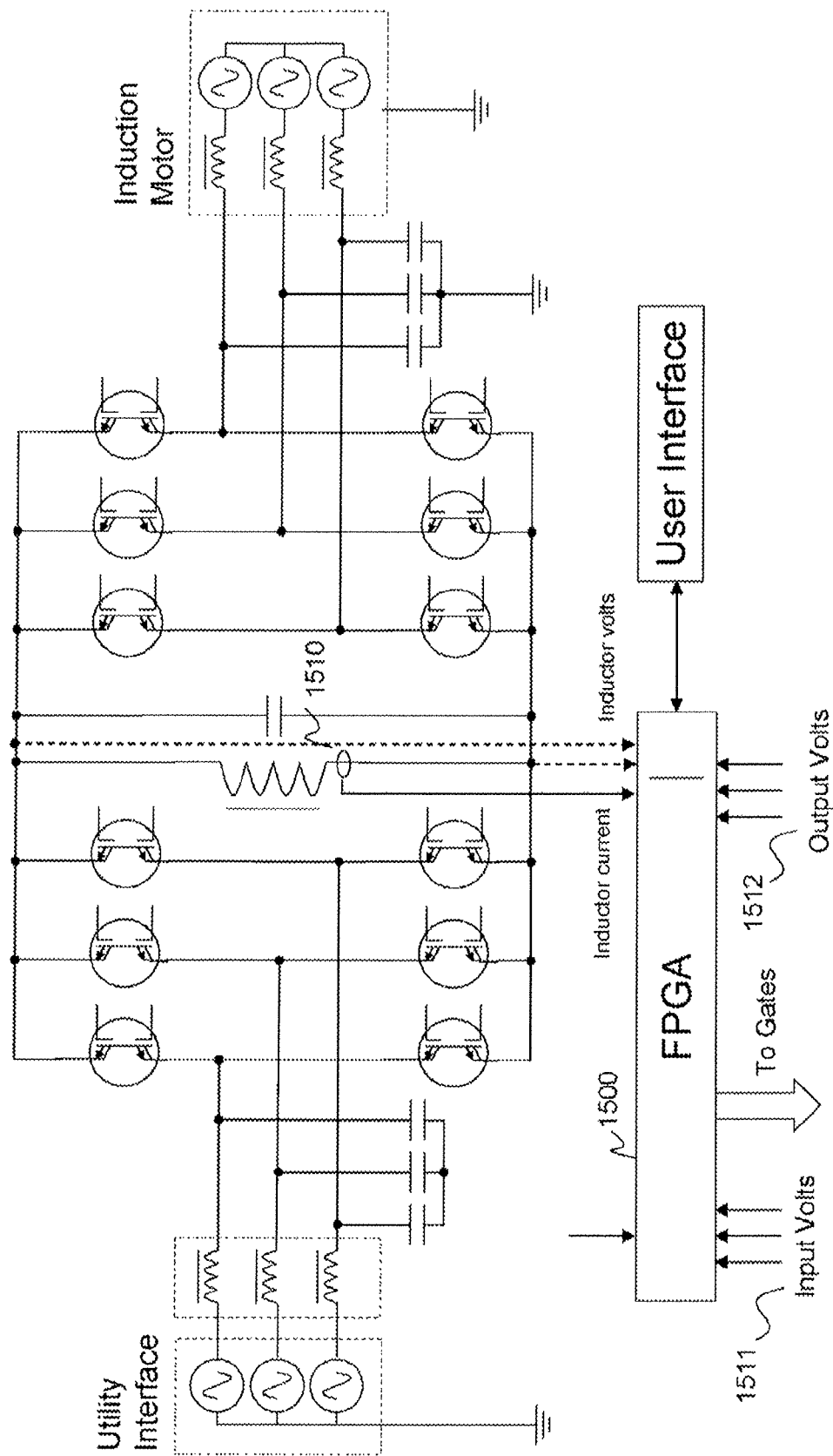
Figure 15 - Controls

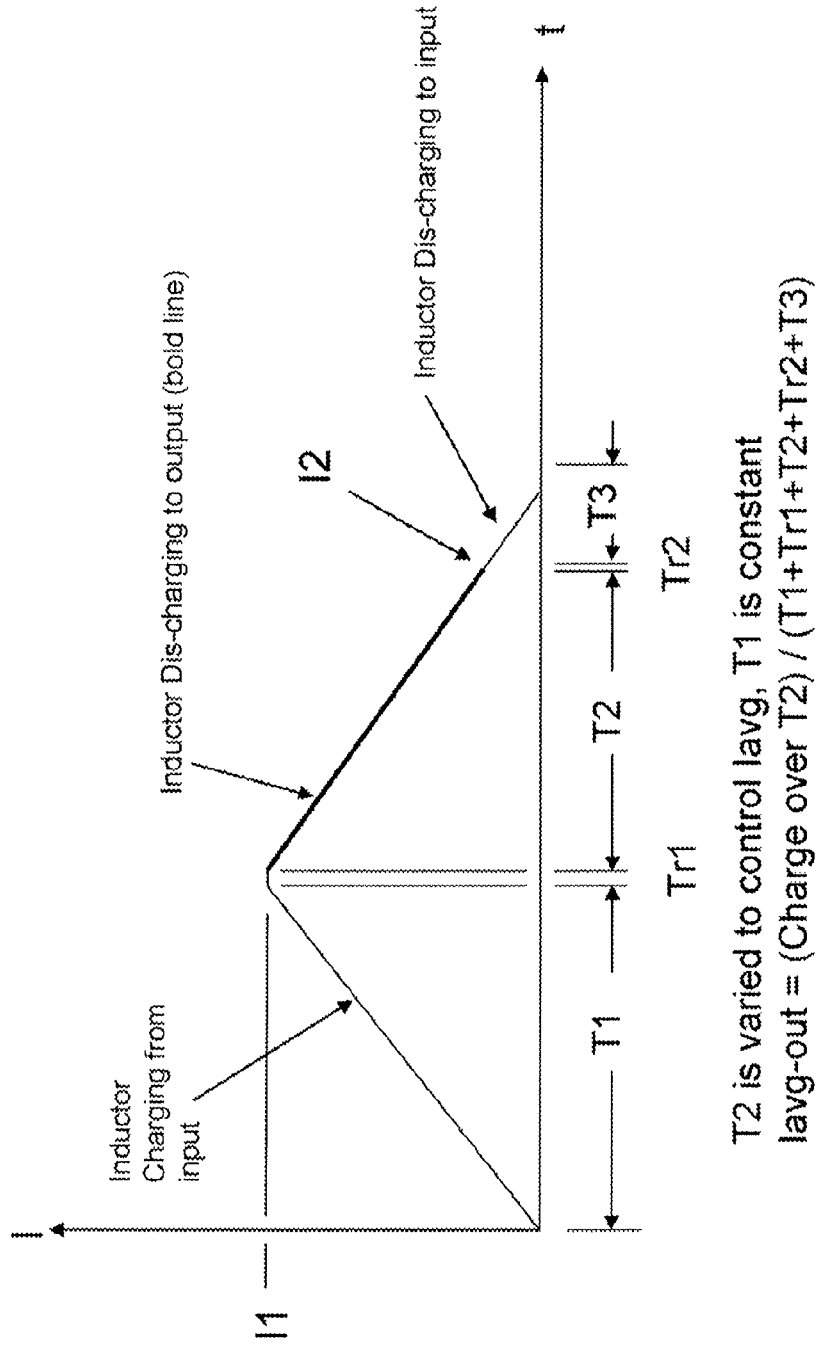
Figure 16 – Output Current – Case 1

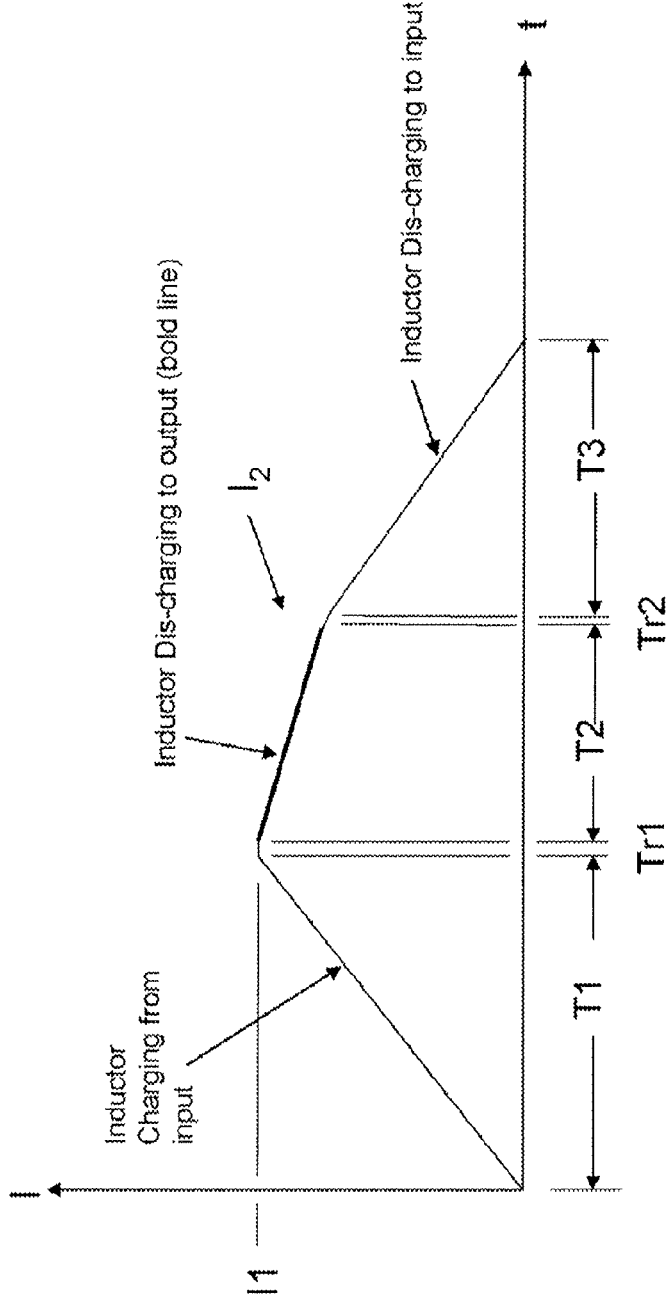
Figure 17 – Output Current – Case 2

| L | 140 uH | Inductor |
|---|---|---|
| Vin | 650 volts | Input Volts |
| Vout | 600 volts | Output Volts |
| T1 | 23.6 uS | Inductor Charge Time |
| dT | 2 uS | Time Step |
| cap | 0.2 uF | Parallel Capacitance |

| | | | | | | | | | | power | |
|---|---|---|---|---|---|---|---|---|---|---|---|
| T2 | I1 | I2 | T3 | Ttotal | Iavg-out | f | | Tr1 | Tr2 | | Iavg*Vout |
| | T1*Vin/L | I1-T2*Vout/L | I2*L/Vin | T1+T2+T3+Tr1+Tr2 | (I1+I2)*T2/(2*Ttotal) | 1000000/(2*Ttotal) | | (Vin+Vout)*cap/I1 | (Vin-Vout)*cap/I2 | | |
| uS | Amps | Amps | uS | uS | Amps | Hz | | uS | uS | | watts |
| 0 | 109.5714 | 109.5714286 | 0 | 49.57288136 | 0 | 10086.2 | | 2.28161669 | 0.091264668 | | 0 |
| 2 | 109.5714 | 101 | 21.753846 | 49.73447274 | 4.233912957 | 10053.4 | | 2.28161669 | 0.099009901 | | 2540.348 |
| 4 | 109.5714 | 92.42857143 | 19.907692 | 49.89750065 | 8.096597921 | 10020.5 | | 2.28161669 | 0.108191654 | | 4857.959 |
| 6 | 109.5714 | 83.85714286 | 18.061538 | 50.06240558 | 11.59124712 | 9987.53 | | 2.28161669 | 0.119250426 | | 6954.748 |
| 8 | 109.5714 | 75.28571429 | 16.215385 | 50.22982863 | 14.72090572 | 9954.24 | | 2.28161669 | 0.132827324 | | 8832.543 |
| 10 | 109.5714 | 66.71428571 | 14.369231 | 50.40074039 | 17.48840522 | 9920.49 | | 2.28161669 | 0.149892934 | | 10493.04 |
| 12 | 109.5714 | 58.14285714 | 12.523077 | 50.57668378 | 19.89623753 | 9885.98 | | 2.28161669 | 0.171990172 | | 11937.74 |
| 14 | 109.5714 | 49.57142857 | 10.676923 | 50.76026887 | 21.94629825 | 9850.22 | | 2.28161669 | 0.201729107 | | 13167.78 |
| 16 | 109.5714 | 41 | 8.8307692 | 50.95628836 | 23.63930866 | 9812.33 | | 2.28161669 | 0.243902439 | | 14183.59 |
| 18 | 109.5714 | 32.42857143 | 6.9846154 | 51.17460212 | 24.97332558 | 9770.47 | | 2.28161669 | 0.308370044 | | 14984 |
| 20 | 109.5714 | 23.85714286 | 5.1384615 | 51.4392399 | 25.93906358 | 9720.21 | | 2.28161669 | 0.419161677 | | 15563.44 |

| T2 | Discharge Time |
|---|---|
| I1 | Peak charge current |
| I2 | Current after discharge |
| T3 | Discharge Time to Input |
| Ttotal | total cycle time |
| Iavg-out | Average output current |
| f | inductor frequency |
| Tr1 | Capacitor ramp time after Ti1 |
| Tr2 | Capacitor ramp time after Ti2 |
| T1 | Inductor Charge time |

Figure 18 – Spreadsheet to calculate Average Output Current and Power

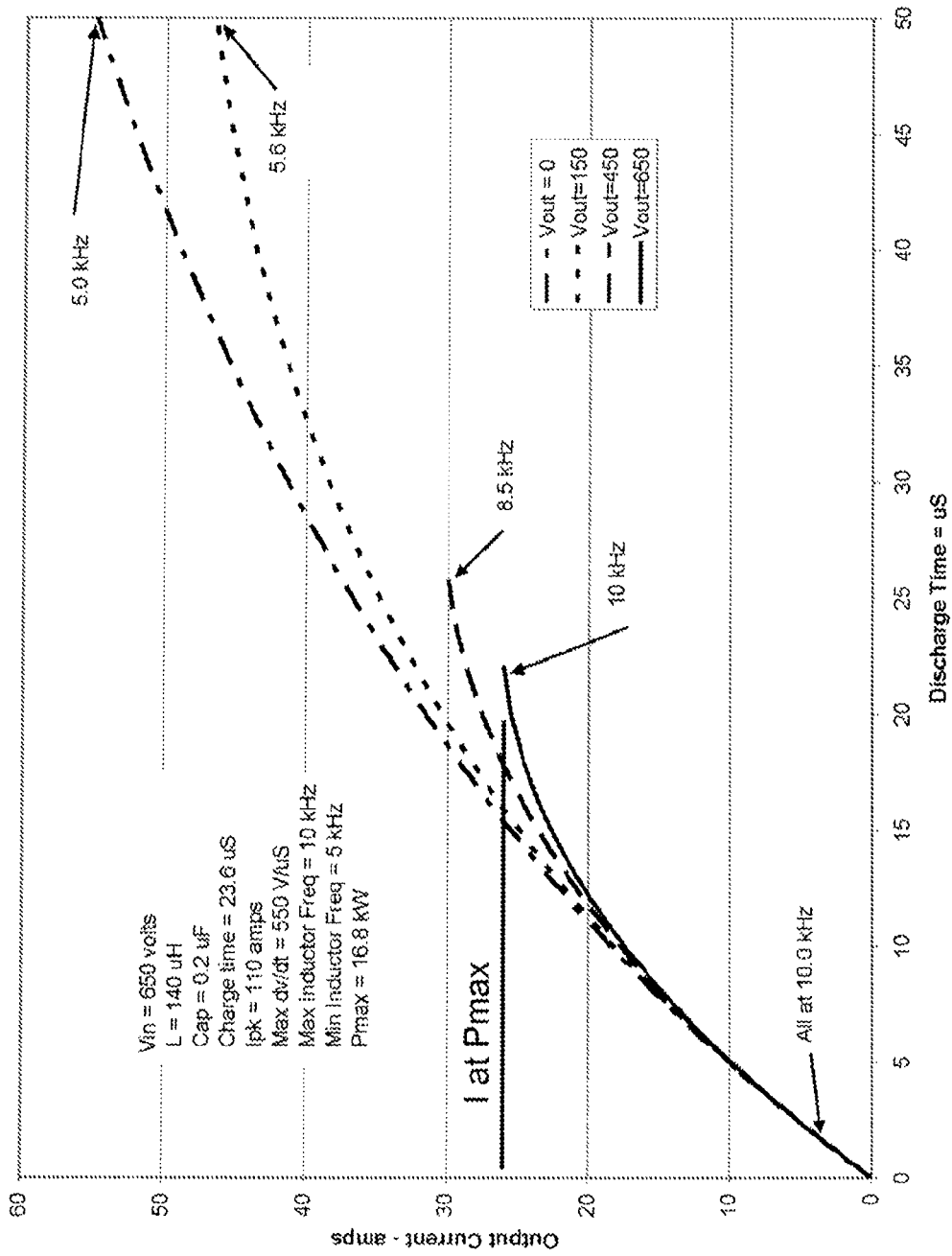
Figure 19 – Spreadsheet results – Motoring

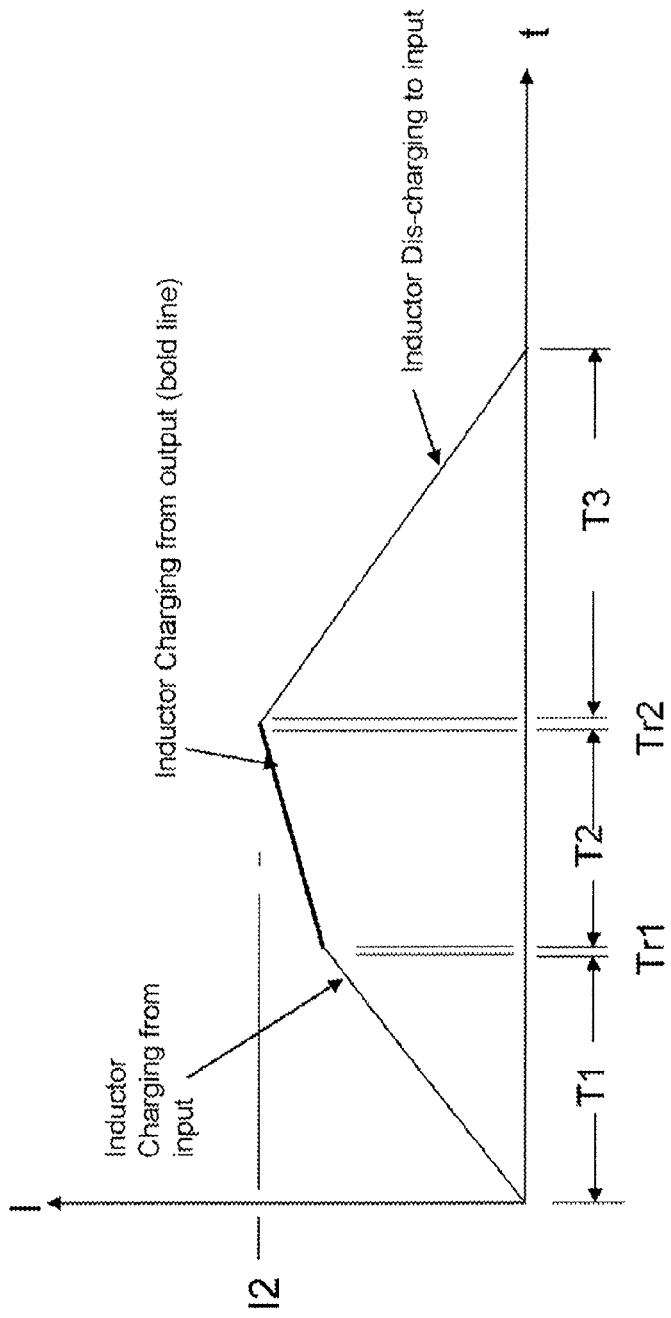
Figure 20 – Output Current – Case 3

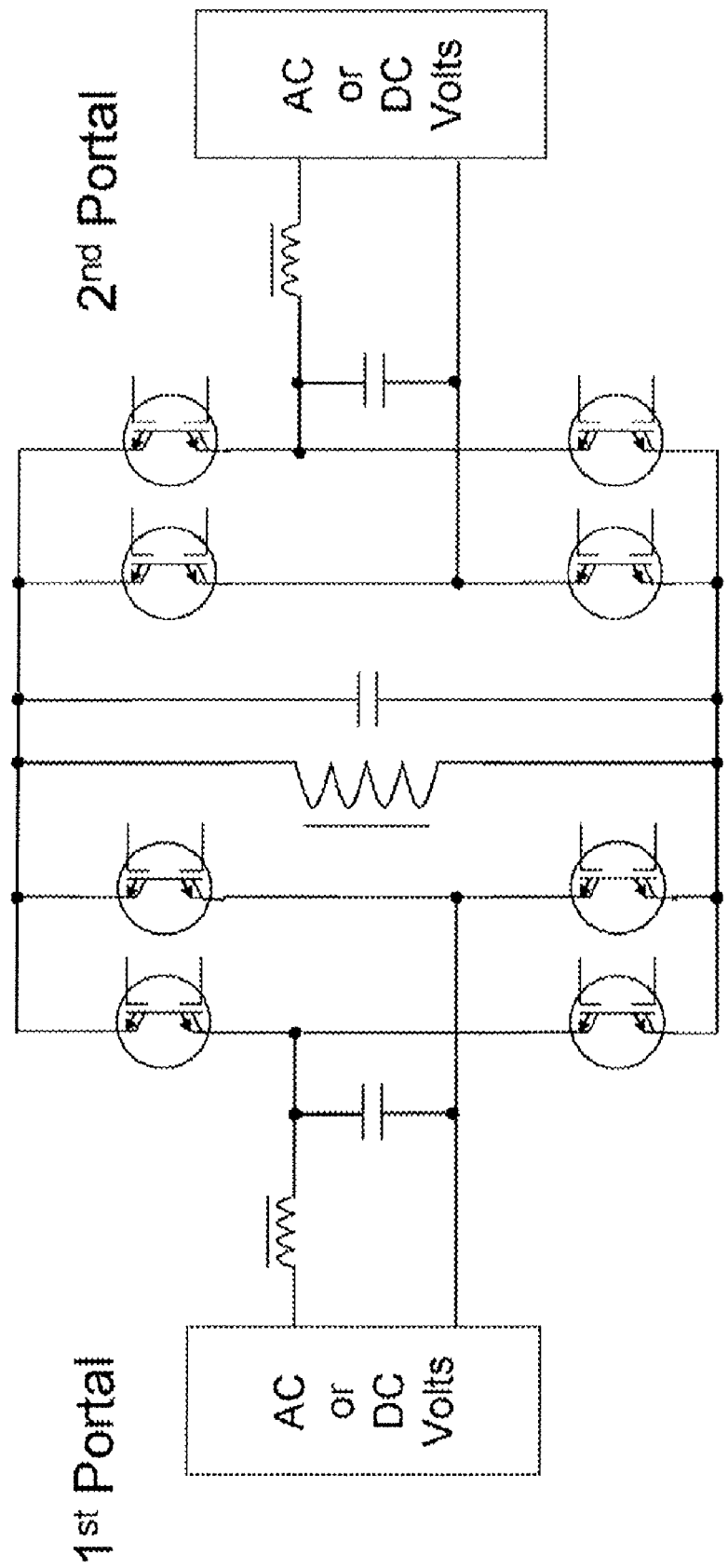
Figure 21 – DC or Single Phase AC

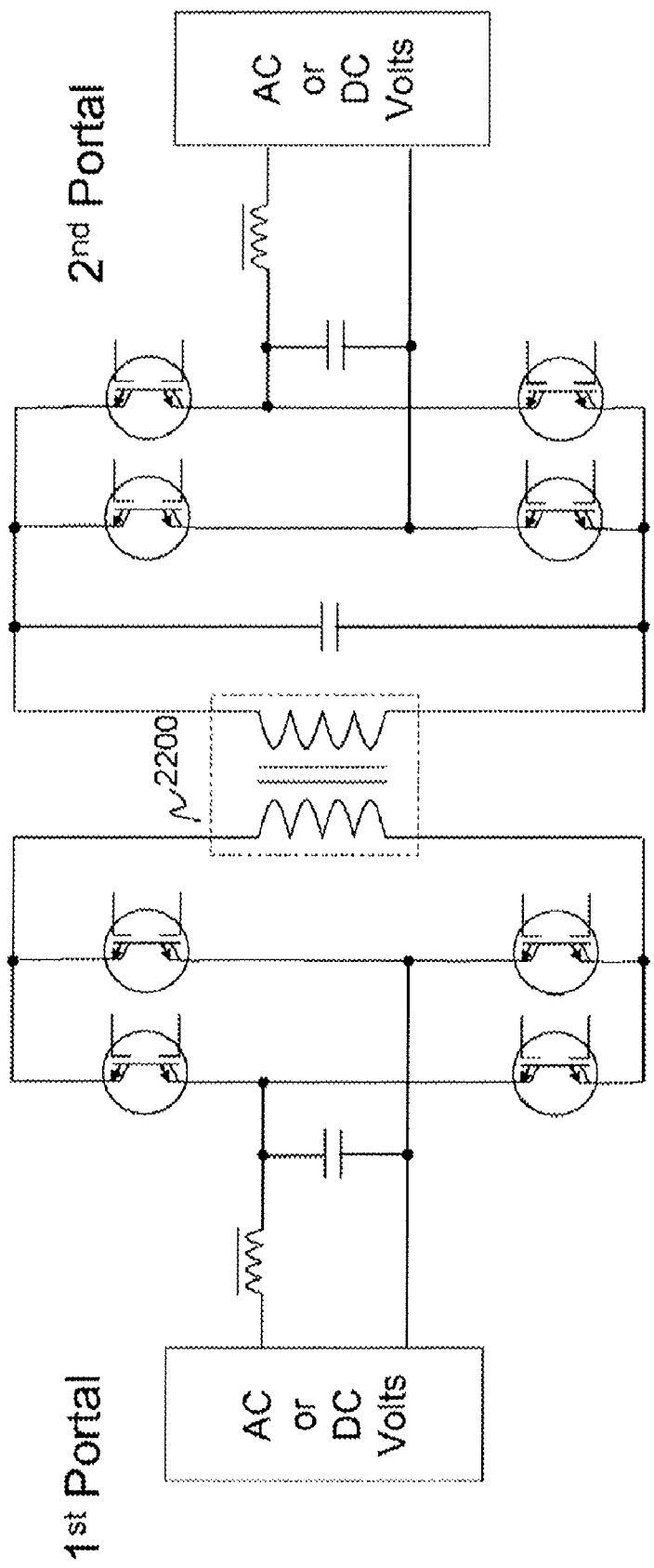
Figure 22 – Transformer/Inductor

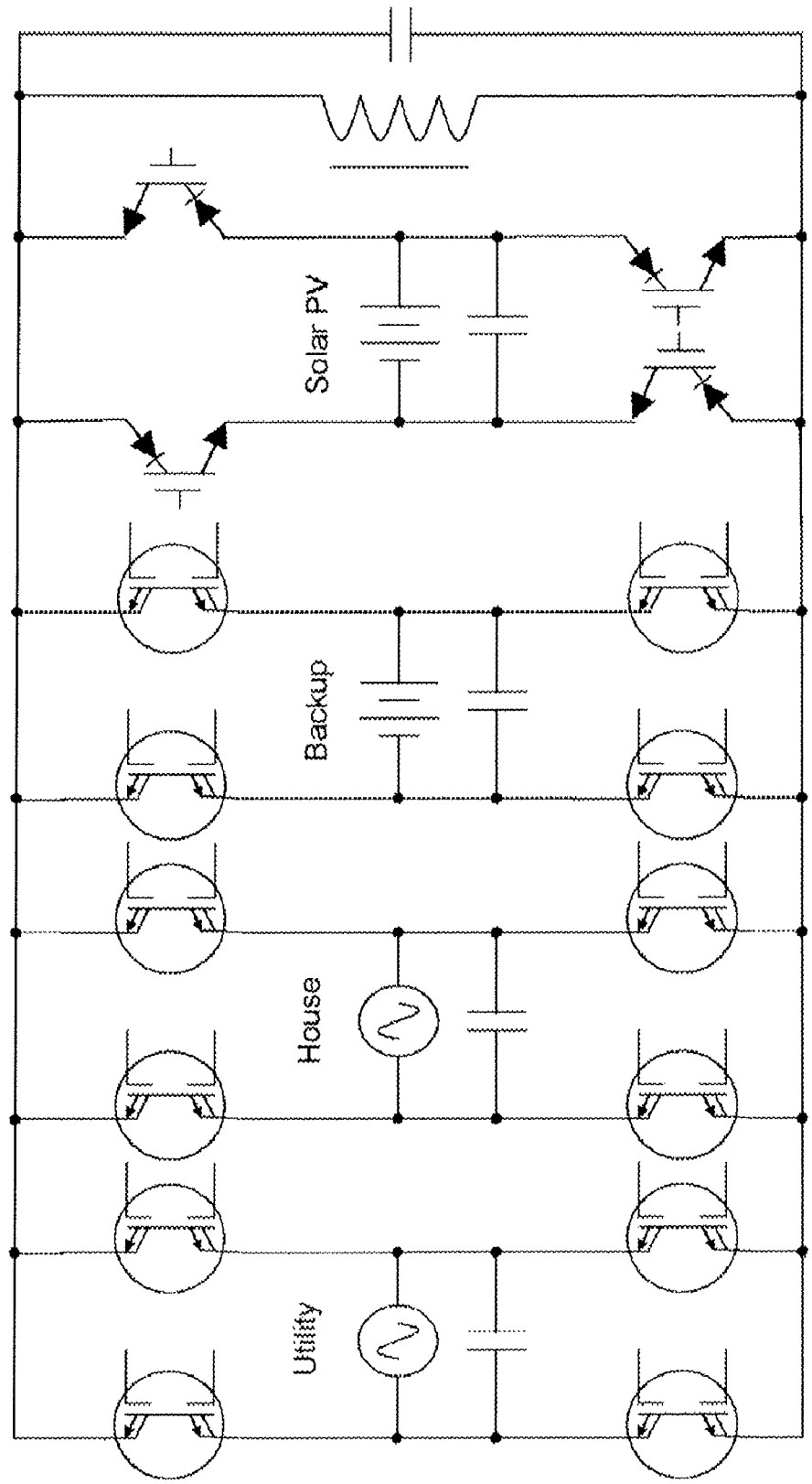
Figure 23 – Solar Power Converter

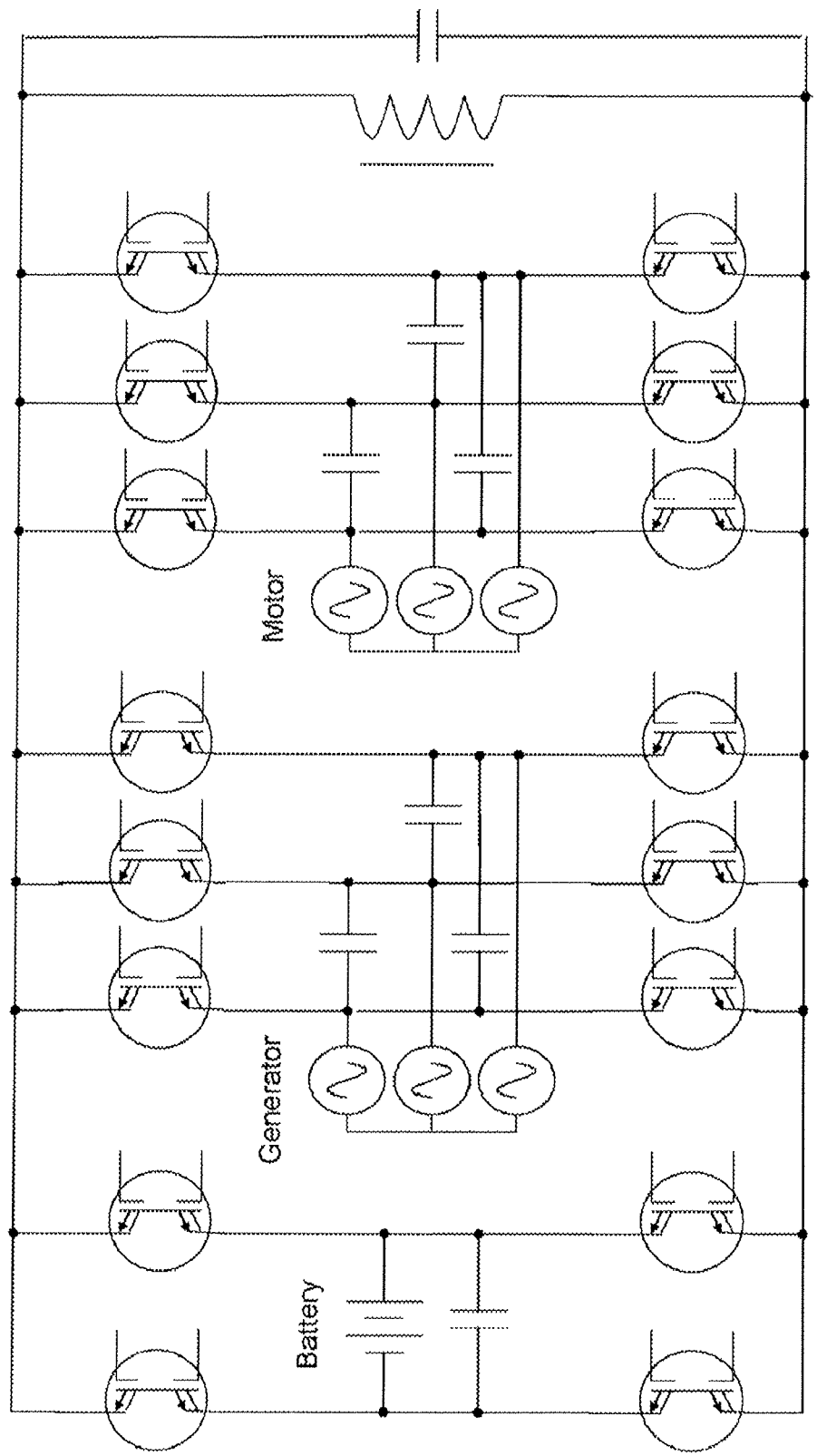
Figure 24 – Hybrid Vehicle Power Converter

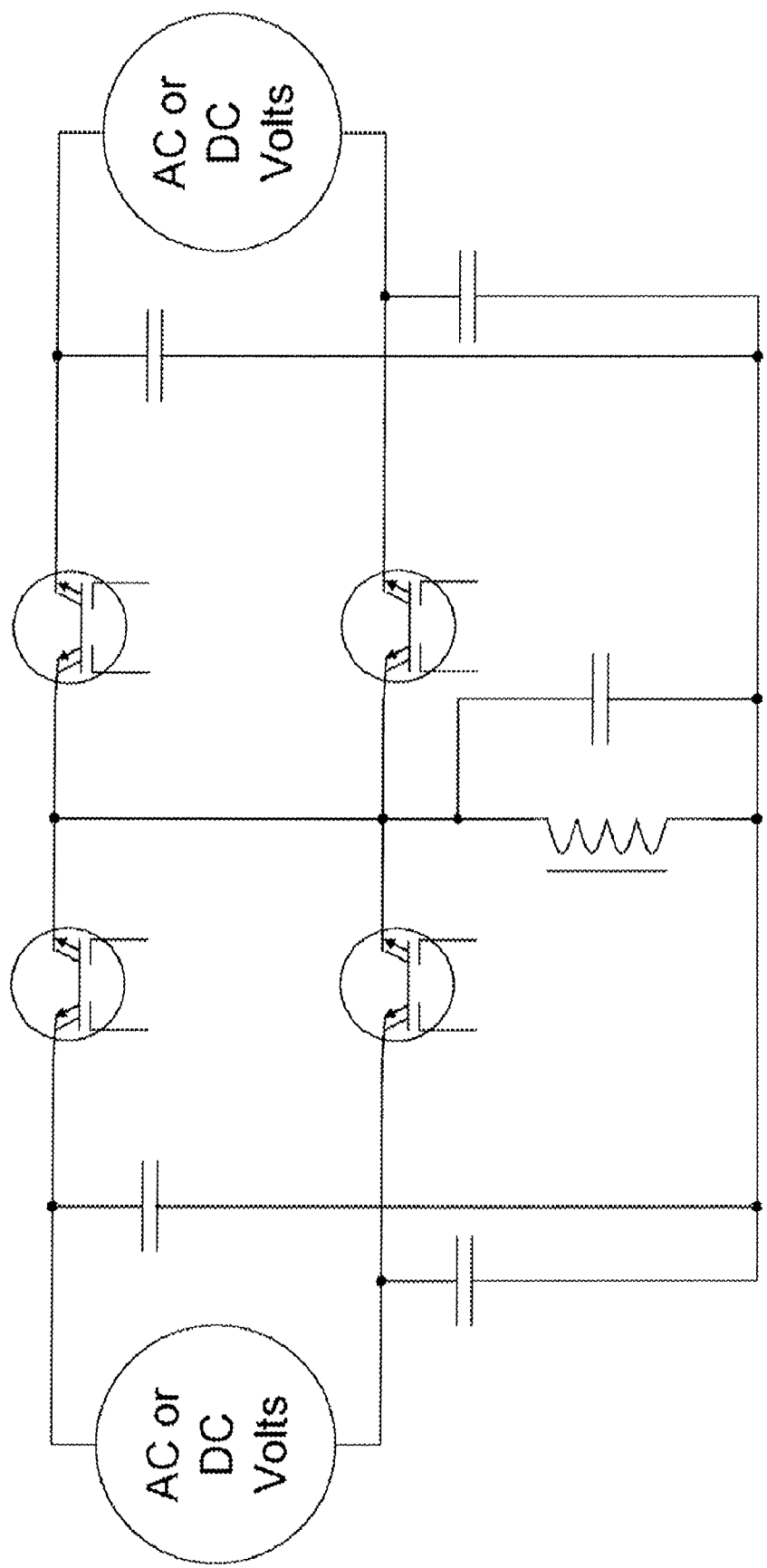
Figure 25 – Single Phase and/or DC Half Bridge

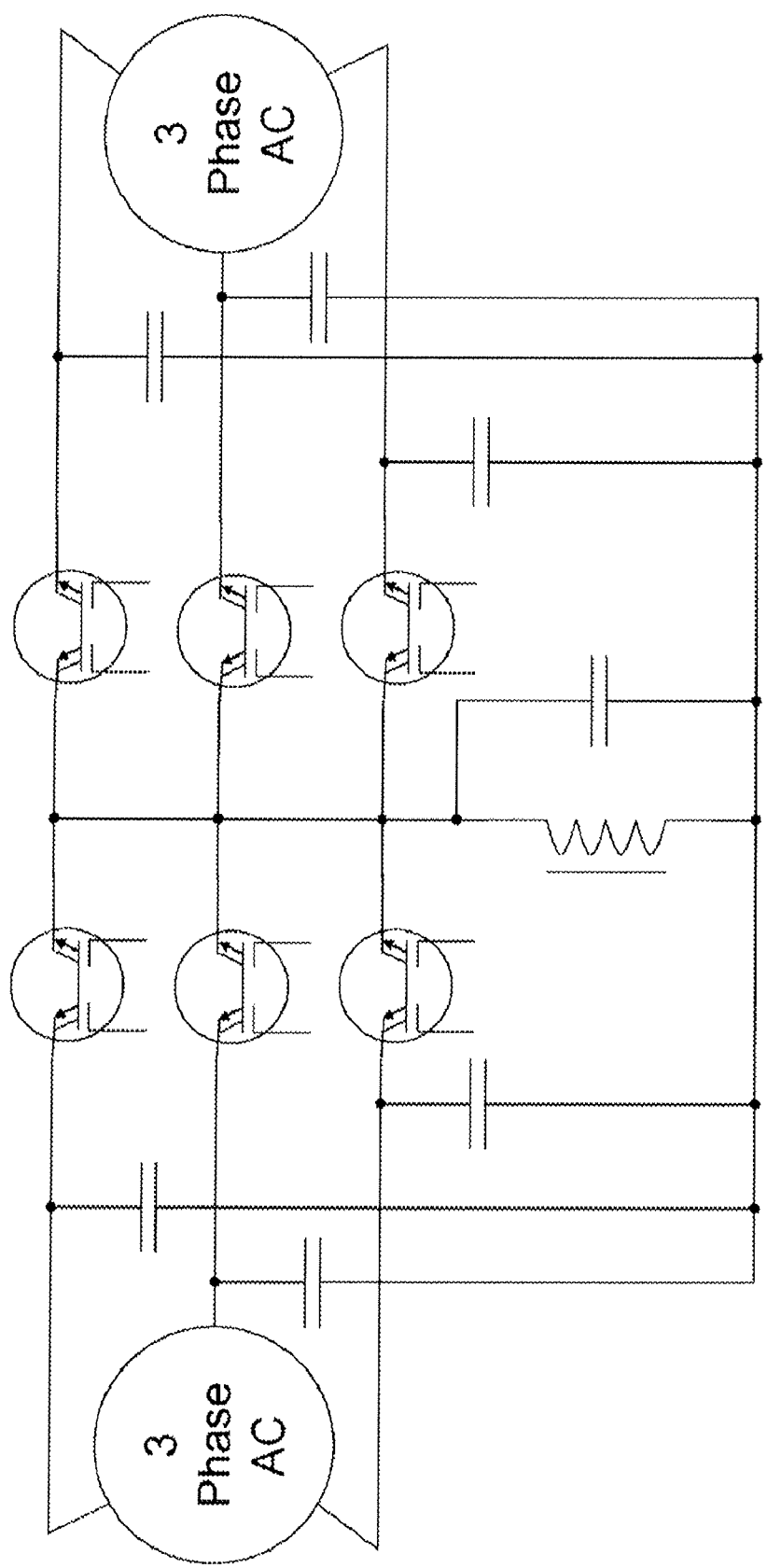
Figure 26 – Three Phase Half-Bridge

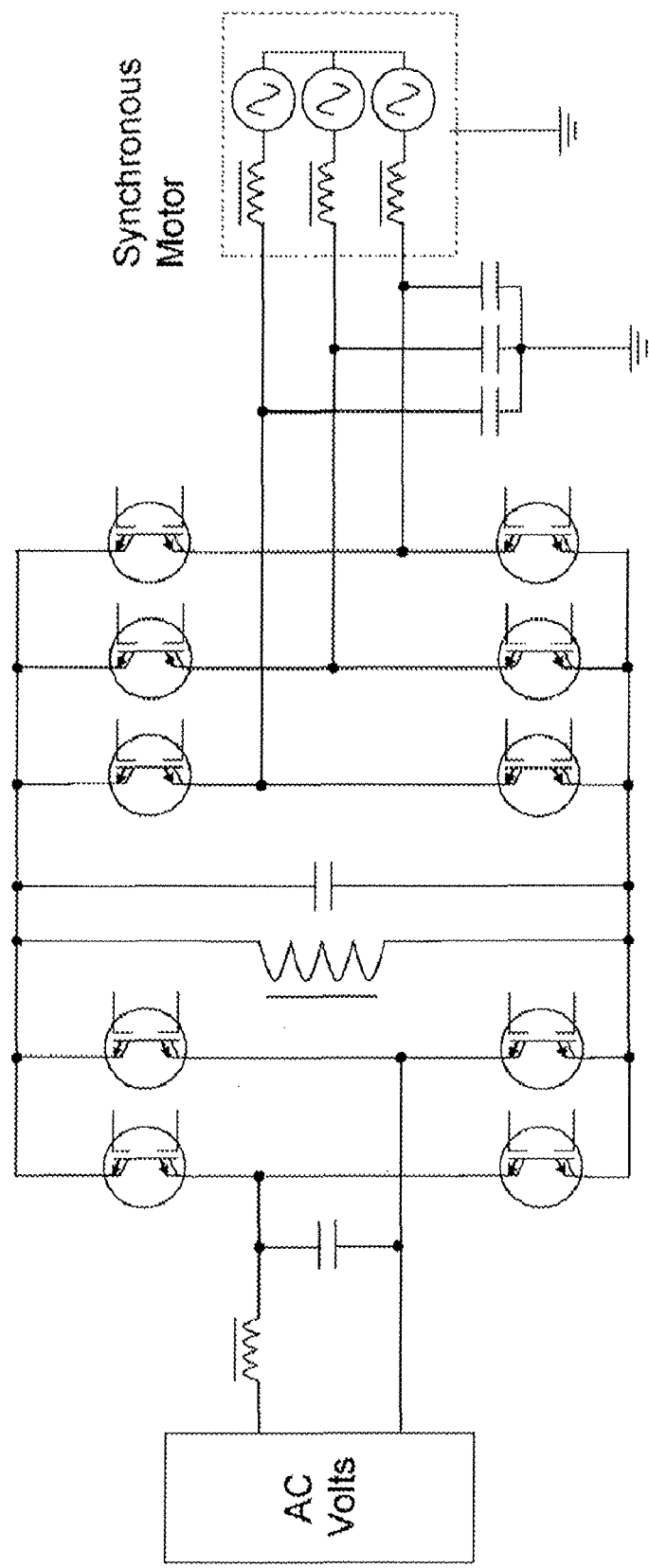
Figure 27 – Single Phase to Pulsing Three Phase

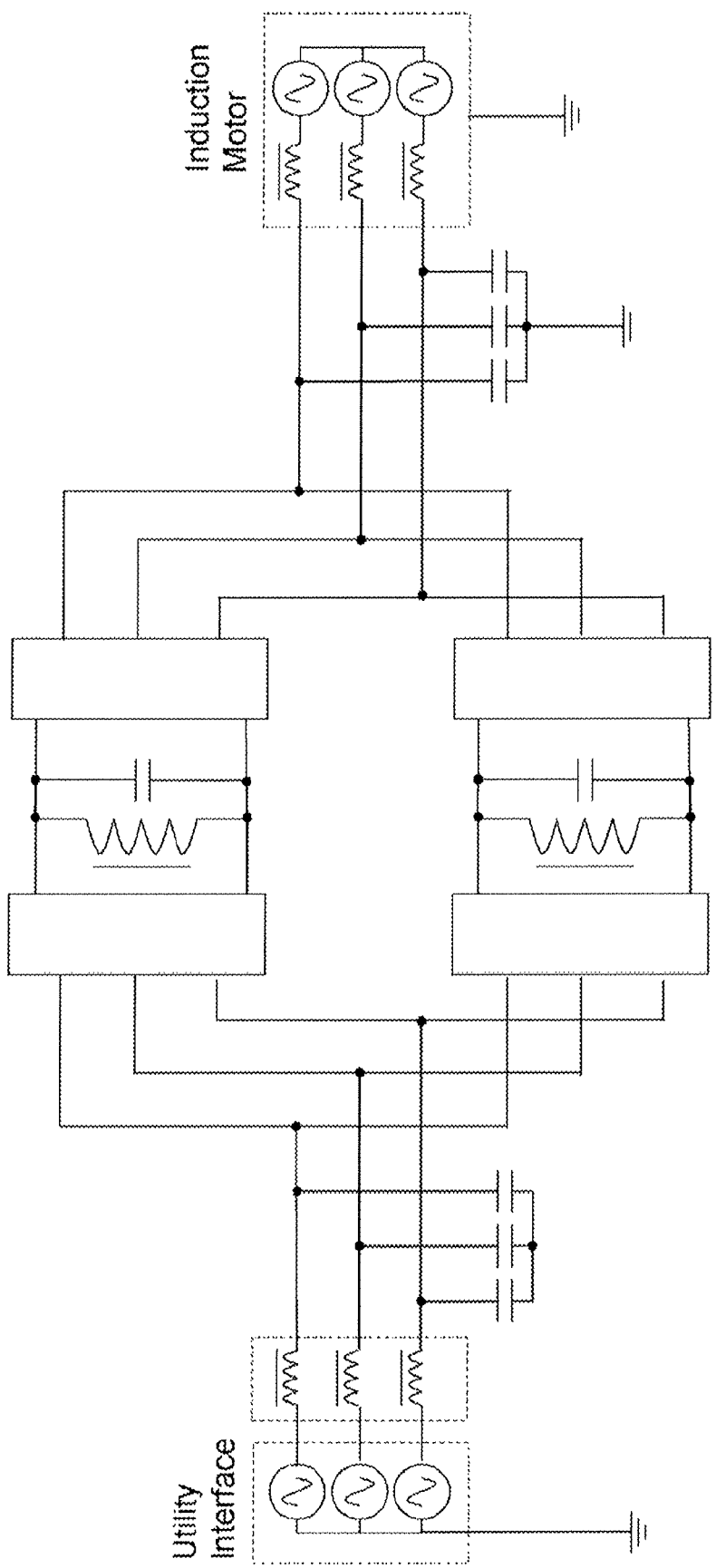
Figure 28 – Dual Power Module Configuration

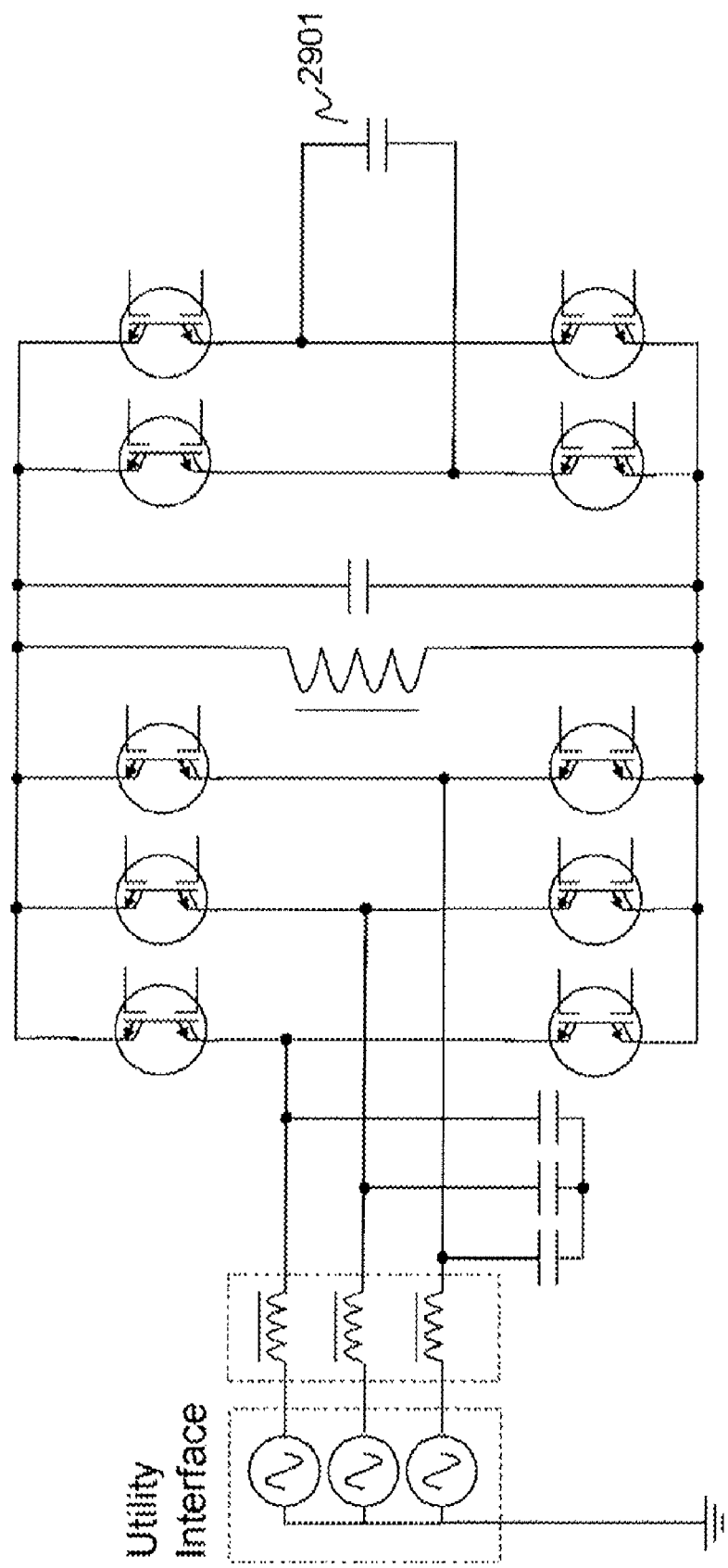
Figure 29 – Three Phase Line Conditioner

POWER CONVERSION WITH ADDED PSEUDO-PHASE

CROSS-REFERENCE

Priority is claimed from U.S. Provisional application 61/234,373 filed 17 Aug. 2009, which is hereby incorporated by reference. Priority is also claimed from U.S. application Ser. No. 12/479,207, filed Jun. 5, 2009 and now published as US2010/0067272, and therethrough from U.S. application Ser. No. 11/759,006, filed Jun. 6, 2007 and now issued as U.S. Pat. No. 7,599,196, and therethrough from U.S. application 60/811,191 filed Jun. 6, 2006. Priority is also claimed from Ser. No. 11/758,970 filed Jun. 6, 2007, and also therethrough from U.S. application 60/811,191 filed Jun. 6, 2006. All of these applications are hereby incorporated by reference.

BACKGROUND

The present application relates to power conversion methods, systems, and devices, and more particularly to nonresonant conversion architectures.

Note that the points discussed below may reflect the hindsight gained from the disclosed inventions, and are not necessarily admitted to be prior art.

Power conversion is one of the most important applications of power semiconductors, and plays an important role in many systems. Power conversion can be used to shift the voltage of a power supply to match the operating requirements of a particular load, or to permit use of a variable-voltage or variable current supply, or to compensate for the variation expected in an unreliable power source, or to permit a unit to be usable with a variety of power inputs, or to compensate for shift in "power factor" when an AC supply is connected to a reactive load. In many cases there are different terms for particular kinds of power conversion, e.g. a DC-to-AC converter is often referred to as an inverter, and some types of AC-to-AC converter are referred to as cycloconverters. Many kinds of motor drive can be thought of as a kind of power conversion: for example, a variable-frequency drive can be regarded as a species of power converter in which the frequency of an AC output is adjustable. In the present application the term "power conversion" will be used to refer generically to all of these types.

The present inventor has previously filed on a new class of power converter device operation and device, which provides a nearly universal power conversion architecture. In one version of this architecture, each input line is connected to the middle of one phase leg having two bidirectional switches, and the switches are operated so as to drive the terminals of a link reactance from one input or the other. A corresponding output switch array is used to transfer energy from the link reactance into two or more output terminals as desired, to construct the output waveform desired. Preferably the link reactance includes an inductor which is shunted by a capacitor. This provides a nearly universal hardware architecture, which is operated to implement a desired power-conversion function. This architecture is suitable for DC-AC, AC-AC, and AC-DC conversion. However, the present inventor now provides additional improvements, which are applicable to these as well as other topologies.

Many DC-DC, DC-AC, and AC-AC Buck-Boost converters are shown in the patent and academic literature. The classic Buck-Boost converter operates the inductor with continuous current, and the inductor may have an input and output winding to form a transfer for isolation and/or voltage/current translation, in which case it is referred to as a Flyback Converter. There are many examples of this basic converter, all of which are necessarily hard switched and therefore do not have the soft-switched attribute, which leads to reduced converter efficiency and higher costs.

In a chain of patent applications dating back to 2006, the present inventor has disclosed a revolutionary new power conversion architecture, known as the "UPC" (or "Universal Power Conversion") architecture. Some of these applications include published US applications US2008/0013351 and US2008/0031019, both of which are hereby incorporated by reference. The present application describes further improvements which are particularly advantageous in connection with UPC architectures, and may also be applicable to other architectures.

SUMMARY

The present application discloses new approaches to power conversion and related applications. An energy storage leg, including a capacitor plus switching which connects the capacitor reversibly across a primary link reactance, is added to at least one port of a power converter. Preferably the power converter has an architecture, such as that of the "Universal Power Converter," which would be functional even without the energy storage leg.

The disclosed innovations, in various embodiments, provide one or more of at least the following advantages. However, not all of these advantages result from every one of the innovations disclosed, and this list of advantages does not limit the various claimed inventions.

Increased ability to harvest available energy from "green" sources, including wind and solar power;
Increased lifetime for microinverters;
Compact size for variable frequency drive units;
Increased availability of variable frequency drive in residential applications;
Increased ability to generate pulsed waveforms from DC or low-frequency power inputs.

BRIEF DESCRIPTION OF THE DRAWINGS

The disclosed inventions will be described with reference to the accompanying drawings, which show important sample embodiments of the invention and which are incorporated in the specification hereof by reference, wherein:

FIGS. 2a-2d show four alternative versions of the basic Bi-directional Conducting and Blocking Switch (BCBS) used in the circuit of FIG. 1.

FIG. 3 shows a conventional "Standard Drive".

FIG. 4 shows a conventional hard-switched three phase to three phase AC buck-boost converter.

FIG. 5 shows a conventional soft-switched "partial resonant" three phase to three phase AC buck-boost converter, and FIG. 6 shows the inductor current and voltage waveforms for the converter of FIG. 5.

FIGS. 7 and 8 show other conventional converters.

FIG. 9 shows the input line voltages, and

FIG. 10 shows the output line voltages, for the current switching example of FIGS. 11, 12a-12j, and 13.

FIG. 11 summarizes the line and inductor current waveforms for several inductor cycles.

FIGS. 12a-12j show voltage and current waveforms on the inductor during a typical cycle.

FIG. 13 shows voltage and current waveforms corresponding to the full power condition of FIG. 12, and FIG. 14 shows inductor voltage and current for an output voltage of about half the full output voltage.

FIG. 15 shows another embodiment, which includes Controls and I/O Filtering.

FIG. 16 illustrates current and timing relationships in yet other embodiments, and FIG. 17 shows these relationships when the output voltage is half of the input voltage.

FIG. 18 is a spreadsheet which calculates the average output current for a given set of conditions, as the current discharge time is varied, and FIG. 19 shows the results of this calculation under various conditions.

FIG. 20 is a version of FIGS. 16 and 17 which shows inductor current and timing for a regeneration condition where the output voltage is ½ of the input.

FIG. 21 shows yet another embodiment, with DC or single Phase portals.

FIG. 22 shows yet another embodiment, with a transformer.

FIG. 23 shows yet another embodiment, in a four portal configuration.

FIG. 24 shows yet another embodiment, in a three portal application mixing three phase AC portals and a DC portal, as may be used to advantage in a Hybrid Electric Vehicle application.

FIGS. 25 and 26 show two more classes of implementations using half-bridge topologies.

FIG. 27 shows yet another embodiment, which provides a single phase to three phase synchronous motor drive.

FIG. 28 shows yet another embodiment, with dual power modules.

FIG. 29 shows yet another embodiment, which provides a three phase Power Line Conditioner.

DETAILED DESCRIPTION OF SAMPLE EMBODIMENTS

The numerous innovative teachings of the present application will be described with particular reference to presently preferred embodiments (by way of example, and not of limitation). The present application describes several inventions, and none of the statements below should be taken as limiting the claims generally.

This application describes implementations and/or improvements on the concepts described in U.S. application Ser. No. 11/759,006 filed Jun. 6, 2007 and now published as US2008/0013351, and in U.S. application Ser. No. 11/7580970, now published as US2008/0031019. These applications describe many key concepts, and many other implementations, of the Universal Power Converter. Each of these applications has copendency, common inventorship, and common ownership with the present application. Each of these applications is hereby incorporated by reference in its entirety.

Figure 1A:
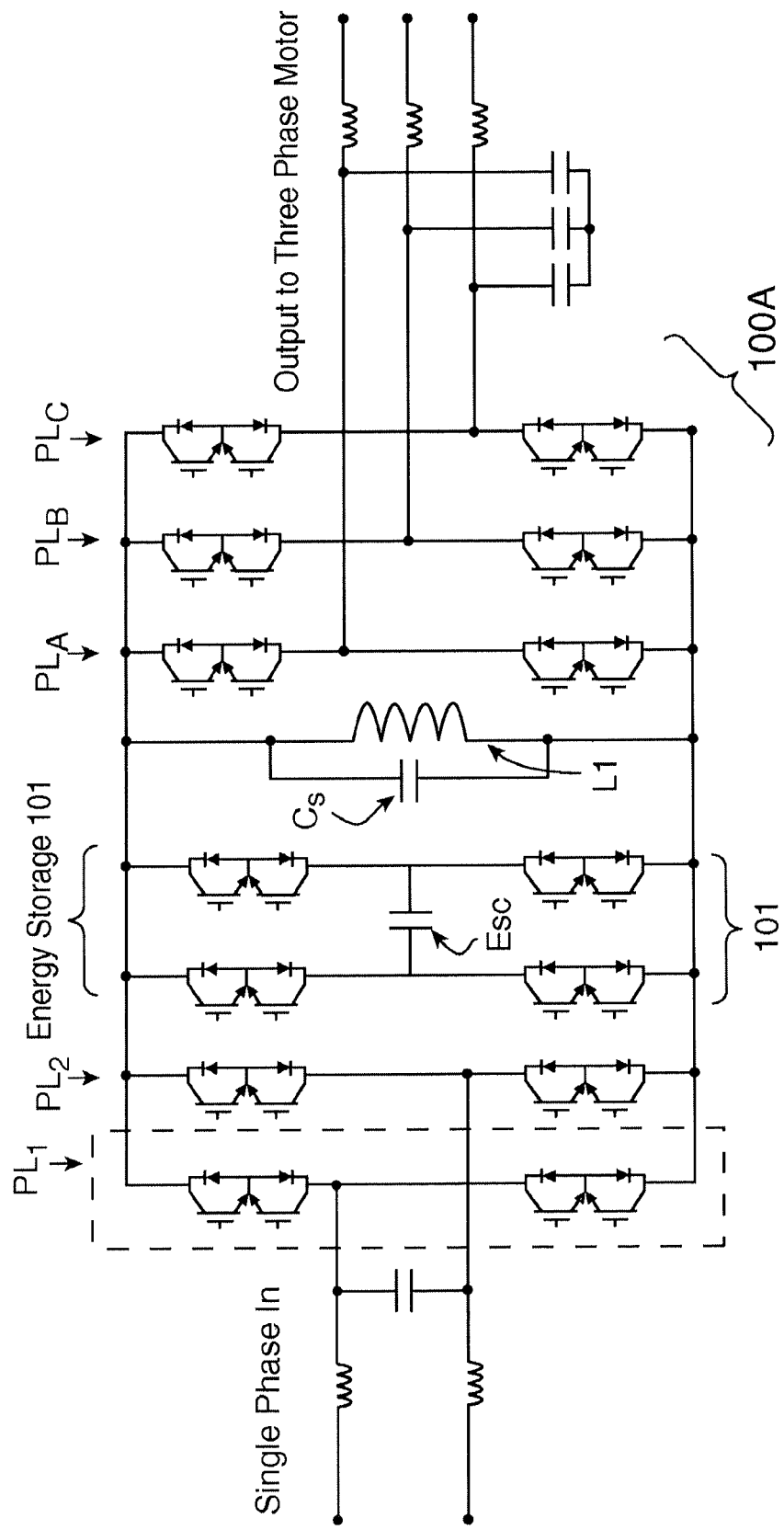
FIG. 1A schematically shows a modified Universal Power Converter circuit configuration, which includes an energy storage capacitor with a bridge circuit to provide a "pseudo-phase".

FIG. 1A shows a first example 100A of the innovative pseudo-phase UPC circuit topology. The two lines of a single-phase input are connected into respective phase legs $PL_1$ and $PL_2$, both of which are connected to a common pair of lines 113/114.

Note that an energy storage section 101 has been added to the UPC in order to buffer energy transfers involving a single phase AC power source or sink. In this example, the energy storage section 101 includes four AC (bi-directional) switches which allow power transfer to or from a connected energy storage capacitor ESC. This power transfer may occur in either direction between the capacitor ESC and the link inductor LI, or in either direction between the capacitor ESC and an external port.

The link inductor LI (with its shunt capacitor Cs) is directly connected to the lines 113/114, but all other components are connected only through switches. Thus the link inductor can be completely isolated by disconnected all the other components from the common lines 113/114.

Passive components are used for filtering on the input and output connections, but other configurations besides that shown can be used.

The common lines 113/114 connect the link inductor LI to the input port and to the energy storage section 101, but also to an output port. In this example three phase legs $P_A$, $P_B$, and $P_C$ are used to drive three output lines as described below.

Thus, when the single phase AC input (on the two terminals at the left side of this drawing) is at or near maximum voltage, power is transferred on each cycle of the link inductor (or link reactance) LI, from the AC input to both the three phase output and the energy storage capacitor. When the single phase AC input is at or near zero voltage, all output power comes from the energy storage capacitor ESC. At some intermediate AC input voltage, power transfer is only between the input and the three phase output.

The disclosed inventions take advantage of the multi-port capability of the UPC to avoid the use of electrolytic capacitors in single phase power converters, and also allows a single UPC to accomplish low harmonic single phase to three phase operations.

The disclosed inventions may also be used to accomplish DC to single phase conversion, single phase to DC conversion, or single phase to single phase conversion with or without frequency conversion, all without the use of electrolytic capacitors.

To minimize the size of the film capacitor used for the energy storage capacitor, the voltage on the energy storage capacitor is made to vary over an almost 2 to 1 voltage range, taking advantage of the buck-boost capability of the UPC.

Single Phase to Multi-Phase

Single phase to three phase conversion is of particular value in residential variable speed AC applications, in which the single phase input is transferred, with unity power factor and low harmonics, to a variable voltage and frequency output to drive an induction motor at variable speeds, as may be used to minimize the power consumption of an AC unit.

Charging: When the Single Phase line is at maximum voltage, we can charge the energy storage capacitor (ESC) while providing full three phase power to the motor, as follows:

1. The link inductor LI (LI) charges to full current from the single phase input line (at max voltage).
2. The link inductor LI disconnects from the input and undergoes voltage reversal.
3. The link inductor LI discharges some energy into the lowest voltage phase pair of the motor (and therefore the current on the Link Inductor LI drops).
4. The link inductor LI disconnects from that lowest voltage phase pair, and then (as an isolated inductor with stored energy) its voltage ramps up.
5. When the Link Inductor's voltage exceeds that of the highest voltage phase pair of the motor, the the link inductor LI LI is connected to discharge more energy into the highest voltage phase pair.
6. The link inductor LI is then disconnected from the highest voltage phase pair, and then (as an isolated inductor with stored energy) its voltage ramps up again.
7. When the voltage on the link inductor LI ramps up to the voltage on the energy storage capacitor ESC, the link inductor LI is connected to discharge its remaining energy into the energy storage capacitor ESC.
8. The above cycle 1-7 is repeated, but with reversed current on the link inductor LI.

Discharging: When the Single Phase line is at zero or low voltage, we discharge the energy storage capacitor (ESC) while providing full three phase power to motor, as follows:

1. The link inductor LI charges to a suitable current from the energy storage capacitor ESC.
2. The link inductor LI is disconnected from The Energy Storage Capacitor, and its voltage ramps down to that of the single phase line.
3. The link inductor LI is then connected to be chargee to higher current from the single phase line input.
4. The link inductor LI is then disconnected from the input, and undergoes voltage reversal.
5. The link inductor LI discharges some energy into lowest voltage phase pair of the output motor, and hence the current on link inductor LI drops.
6. The link inductor LI is then disconnected from the lowest voltage phase pair, and its voltage then ramps up to highest voltage phase pair of motor.
7. The link inductor LI is then connected to discharge its remaining energy into the highest voltage phase pair.
8. The above cycle 1-7 is repeated, but with reversed current through the link inductor LI.

This use of the energy storage section shows why the converters using it are referred to as "pseudo-phase" converters. In general, the energy storage section provides energy storage with a flexibility of timing which provides great synergistic advantages in combination with the Universal Power Converter topology.

Figure 1B:
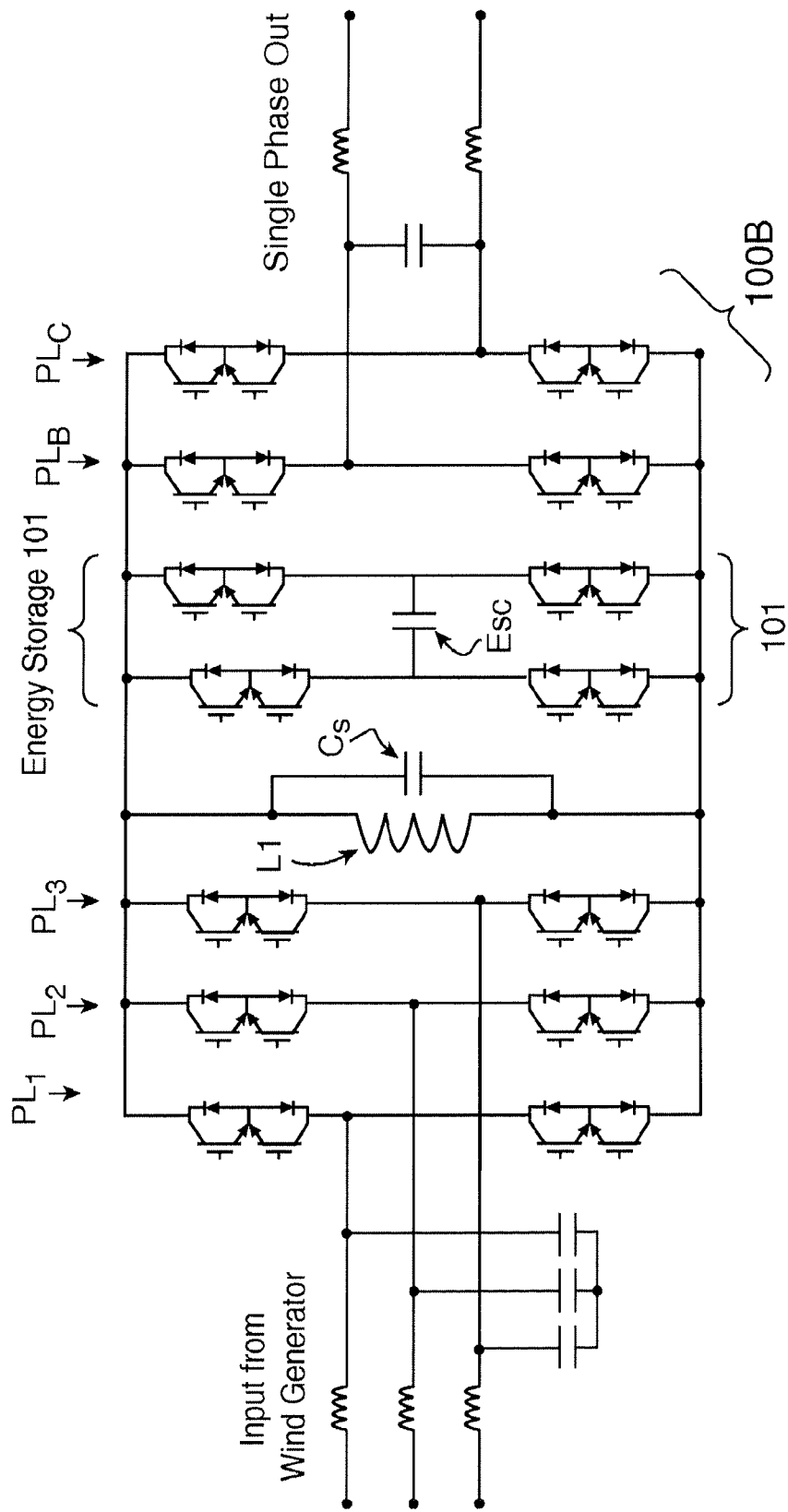
FIG. 1B schematically shows another modified Universal Power Converter circuit configuration, which includes an energy storage capacitor with a full-bridge configuration.
Figure 1C:
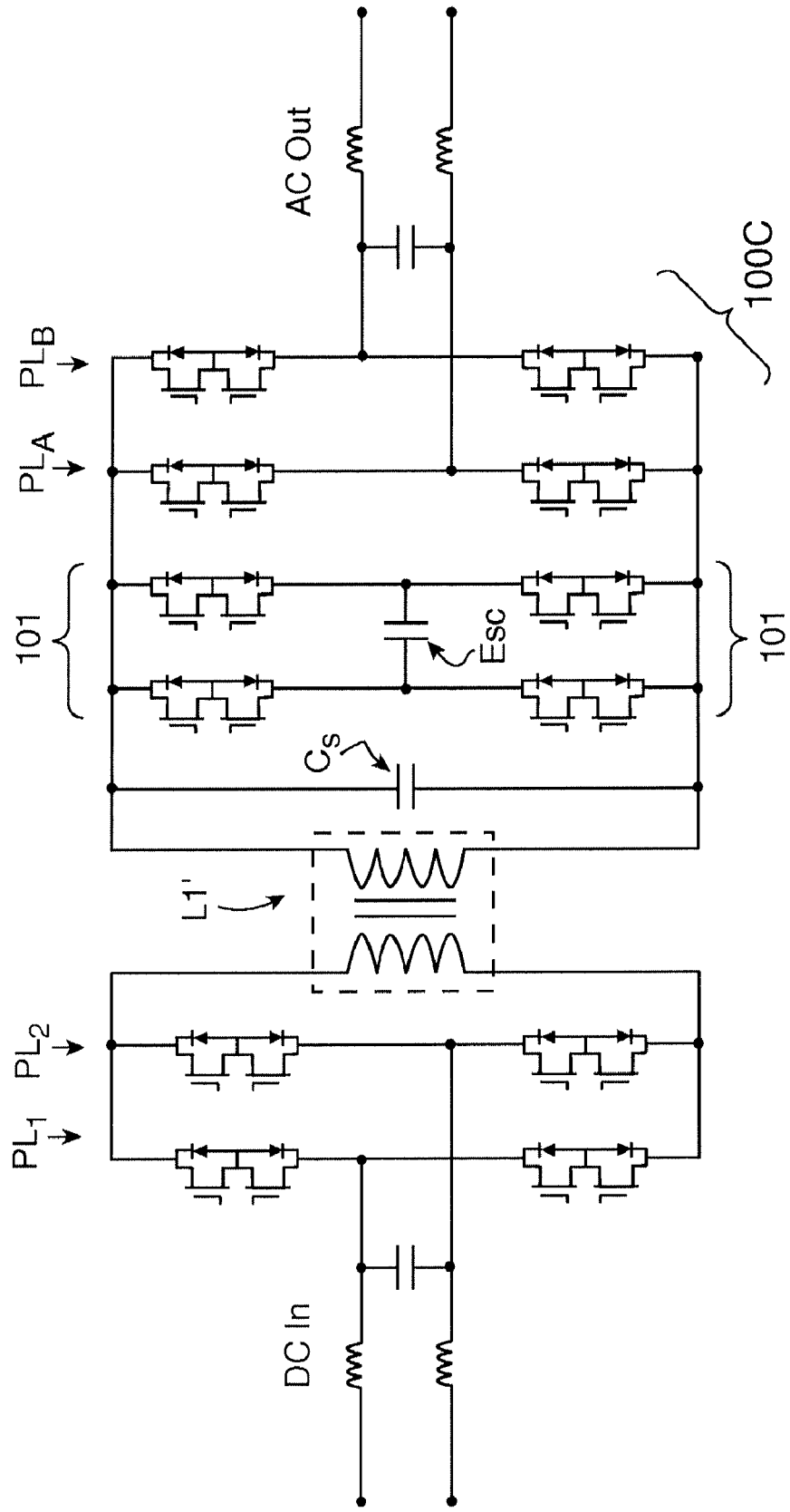
FIG. 1C schematically shows yet another modified Universal Power Converter circuit configuration.
Figure 1D:
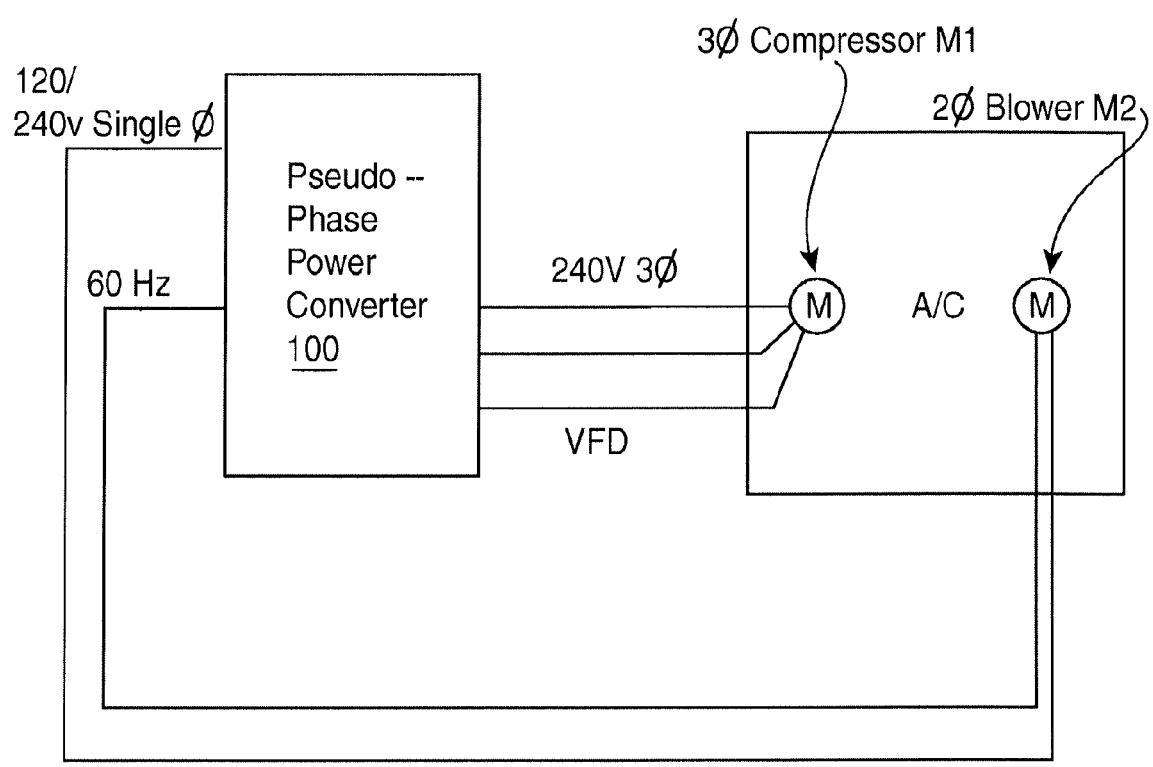
FIG. 1D schematically shows a system in which a pseudo-phase power converter provides a Variable Frequency Drive output to an appliance (in this example the compressor motor of an air conditioner), in an environment where three-phase power is not available.

FIG. 1D shows an example of a system incorporating conversion of this type. In this sample embodiment, a residential air conditioning unit is driven with variable frequency, by use of a pseudo-phase converter to generate a variable-frequency three-phase output. In the example show, the compressor motor M1 is driven with three-phase, and the blower motor M2 is driven with the normal 120/240V single phase (or split-phase line); alternatively, two modules 100 can be used to provide independently controlled variable-speed outputs.

FIG. 1B schematically shows another modified Universal Power Converter circuit configuration, which includes an energy storage capacitor with a full-bridge configuration.

Multiphase to Single-Phase

FIG. 1B schematically shows another modified Universal Power Converter circuit configuration 100B, which includes an energy storage capacitor with a full-bridge configuration. Note that the energy storage section 101 is located on the output side here, which is where the single-phase port is.

Figure 1E:
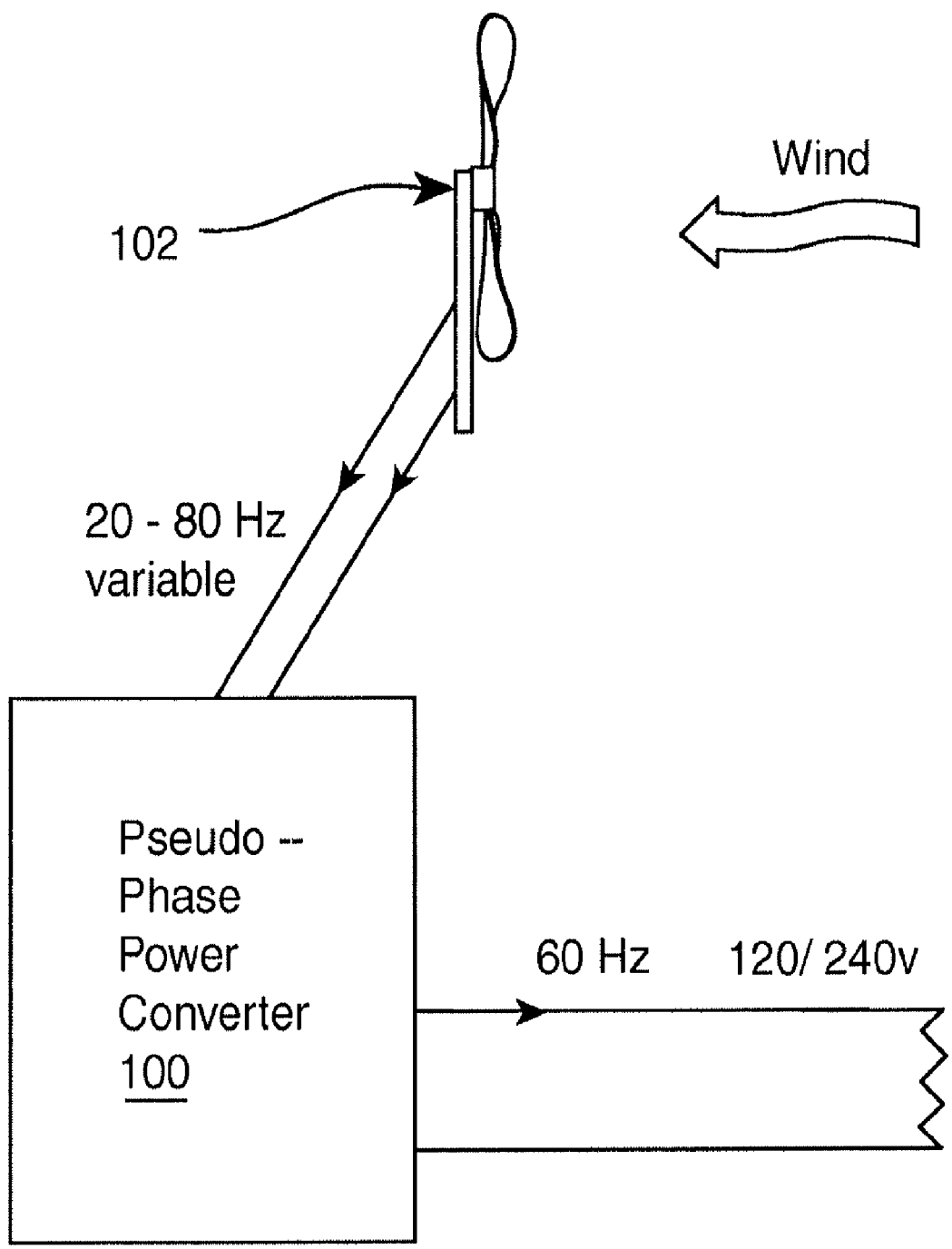
FIG. 1E schematically shows a system in which a pseudo-phase power converter converts power from a wind-driven alternator to provide residential (or other) power supply at standard voltage and frequency.

FIG. 1E shows an example of a system configuration in which this configuration can be particularly useful. With wind-powered electricity generation the available power is inherently variable, and (depending on the electrical configuration used) may result in an AC power output which has variable frequency and/or variable voltage. In the example shown in this Figure, the power from the wind power source is three-phase, with an unpredictable frequency which is typically in the range of 20-80 Hz (depending on conditions). The pseudo-phase converter 100 is used to translate this power into standard voltage and frequency, and (if desired) to lock the phase precisely to the local power grid.

DC to AC

Another possibly significant application of this invention is for Solar PV micro-inverters, which convert the steady DC power of a PV array into the pulsating power of residential single phase AC. All other micro-inverters require using electrolytic capacitors, which have a limited life span.

FIG. 1C schematically shows yet another modified Universal Power Converter circuit configuration 100C. In this example a DC input is connected to two input phase legs PL1 and PL2, which drive the link inductance as described above. Here, however, the link inductance LI' is a transformer. Operation is generally as described above, except that the transformer provides some voltage translation and phase shift between the common rails on the left side and those on the right side. Here the energy storage unit 101 is on the output side, and provides better efficiency by buffering input power when the AC output is near a zero-crossing. The efficient use of the capacitor ESC helps to provide efficient and compact realizations.

The configuration of FIG. 1C provides a microconverter, which is useful for solar power systems as described below. In a sample embodiment, for a microinverter rated at 200 watts for conversion of 40 VDC to 125 VAC single phase, the ESC is about 40 μF, and is operated (on the high voltage side of the circuit) at a voltage which varies cyclically from about 100 to 200 VDC, cycling at 120 Hz.

Figure 1F:
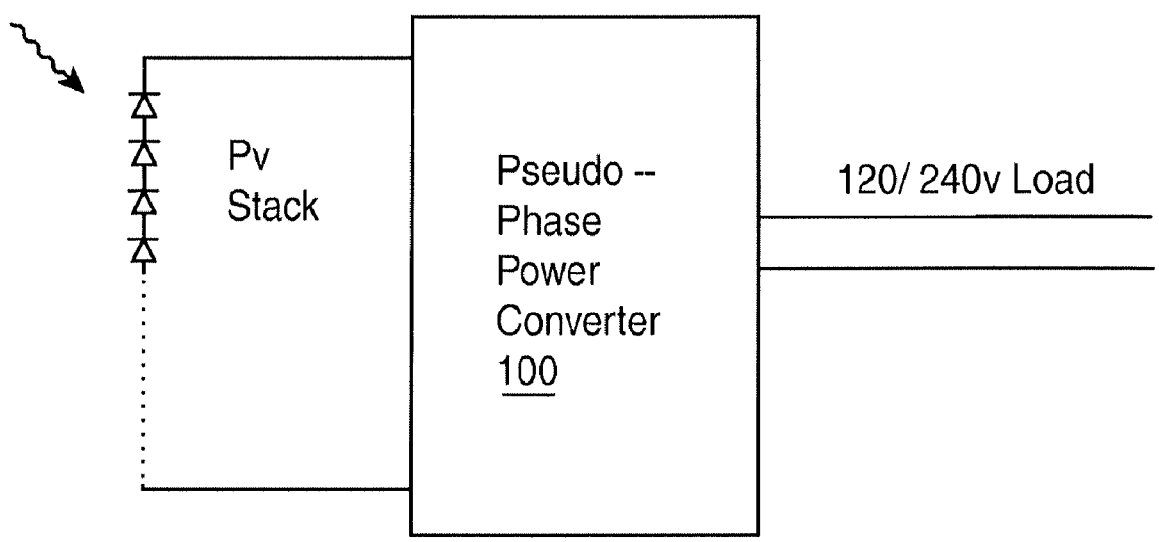
FIG. 1F schematically shows a solar energy system in which a pseudo-phase power converter provides a microinverter which efficiently converts the photovoltaic power to provide residential (or other) power supply at standard voltage and frequency.

FIG. 1F provides an example of a solar energy system using a pseudo-phase power converter 100, which can optionally be the same as converter 100C of FIG. 1C. Here a photovoltaic stack provides a DC voltage to the converter 100, which converts the DC input into a single-phase AC output. Optionally a grid connection is provided, so that power can be fed back into the mains, or at least kept in phase with mains power.

Many features and modifications of the basic UPC architecture will now be described, to help show other advantages and modifications of the pseudo-phase versions of the UPC.

The present application discloses power converters which are generally of the Buck-Boost family, but which use capacitance, either parasitic alone or with added discrete device(s), in parallel with the Buck-Boost inductor to achieve low turn-off switching stresses (i.e. "soft switching") on the semiconductor switches, allowing relatively slow and inexpensive switches to be used. In alternative disclosed embodiments, as discussed below, operation without such added capacitance is possible, at the expense of higher forward turn-off switching losses.

Figure 1G:
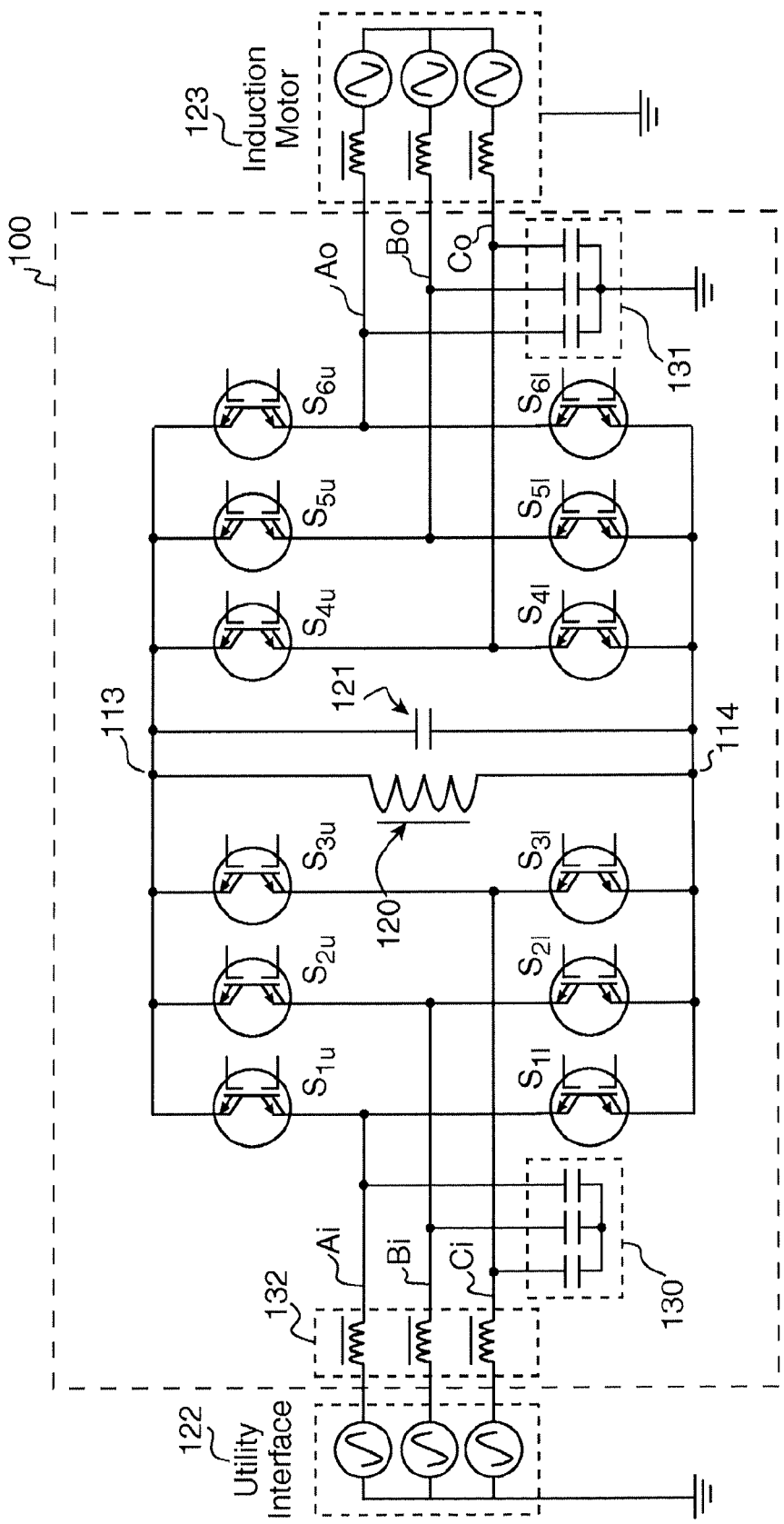
FIG. 1G shows a sample embodiment in a Full-Bridge Buck-Boost Converter.

In FIG. 1G, and various other disclosed embodiments, even if little or no parallel capacitance is used, switch turn on always occurs as the switch transitions from reverse to forward bias, allowing for low turn-on losses. Reverse recovery of the switches is accomplished with low rates of current decrease, and with low reverse recovery voltage, leading to near zero loss reverse recovery switching.

The embodiments described below are improvements on the "Full Cycle" mode of the parent applications, which results in two power transfers per inductor cycle. Buck-Boost converters, including those of the Ngo and Kim references cited above, have a DC bias in the inductor current, and only one power transfer per inductor cycle.

The disclosed inventions can also be used for DC-AC, AC-DC, AC-AC, or DC-DC conversion, with no limitation on the relative magnitudes of the voltages involved as long as the voltage rating of the switches is not exceeded. However, if the implementation is such that one portal is always a higher voltage than the other portal, then the switches connected to said higher portal need only be able to block voltage in one direction.

Full electrical isolation and/or greater voltage and current conversion may be achieved by using an inductor/transformer instead of the simple inductor. Note that the inductor/transformer will typically not have current in both sides at the same time, so its operation is more like a split inductor (as in a flyback converter) than like a simple transformer (as in a push-pull converter. Another significant different between buck-boost and push-pull is that the push-pull output voltage is fixed as a multiple or fraction of the input voltage, as given by the turns ratio, while the buck-boost has no such limitation. Push-pull topologies are described at http://en.wikipedia.org/wiki/Push-Pull_Converter, which (in its state as of the filling date) is hereby incorporated by reference. A push-pull is quite unlike a buck-boost or flyback converter, in that the transformer is not operated as an energy-transfer inductor. In a buck-boost or flyback, input current pumps energy into a magnetic field, which is then drained to drive output current; thus the input and output currents flow at different times.

Inductor/transformer leakage inductance is typically a significant concern of buck-boost designs. This is typically dealt with by minimizing the leakage, and sometimes by adding circuit elements to deal with it. By contrast, many of the embodiments described below can tolerate large parasitic capacitance, and thus inductors or transformers with very close windings can be specified, to minimize the leakage inductance. The standard hard switched buck-boost cannot tolerate parasitic capacitance, which makes it very difficult to minimize the leakage inductance for those configurations.

The innovative converter circuits, in various elements are constructed of semiconductor switches, an inductor, advantageously a capacitor in parallel with the inductor, and input and output filter capacitances. A control means, controlling the input switches, first connects the inductor, initially at zero current, to the input voltage, which may be DC or the highest line-to-line voltage AC pair in a three phase input, except at startup, in which case a near zero-voltage line pair is used. The control then turns off those switches when the current reaches a point determined by the control to result in the desired rate of power transfer. The current then circulates between the inductor and capacitor, which results in a relatively low rate of voltage increase, such that the switches are substantially off before the voltage across them has risen significantly, resulting in low turn-off losses.

With DC or single phase AC input, no further current is drawn from the input. With three phase AC input, the control will again connect the inductor to the input lines, but this time to the line-to-line pair which has a lower voltage then the first pair. Turn on is accomplished as the relevant switches transition from reverse to forward bias. After drawings the appropriate amount of charge (which may be zero if the control determines that no current is to be drawn from the pair, as for example that the pair is at zero volts and input unity power factor is desired), the relevant switches are again turned off. Under most conditions, the voltage on the inductor will then reverse (with relatively low rates of voltage change due to the parallel capacitance). With three phase AC output, the control will turn on switches to allow current to flow from the inductor to the lowest voltage pair of lines which need current, after the relevant switches become forward biased, with the control turning off the switches after the appropriate amount of charge has been transferred. The inductor voltage then ramps up to the highest output line-to-line pair for three phase AC, or to the output voltage for single phase AC or DC. Again, switches are turned on to transfer energy (charge) to the output, transitioning from reverse to forward bias as the voltage ramps up. If the output voltage is larger then the highest input voltage, the current is allowed to drop to zero, which turns off the switch with a low rate of current reduction, which allows for the use of relatively slow reverse recovery characteristics. If the output voltage is less then the highest input voltage, the switches are turned off before current stops, so that the inductor voltage ramps up to the input voltage, such that zero-voltage turn on is maintained. Alternatively, the switches may be turned off before the point cited in the previous sentence, so as to limit the amount of current into the output. In this case, the excess energy due to current in the inductor is directed back into the input by turning on switches to direct current flow from the inductor into either the highest voltage pair in three phase, or the single phase AC or DC input.

In a three phase AC converter, the relative charge per cycle allocated to each input and output line pair is controlled to match the relative current levels on each line (phase). After the above scenario, when zero current is reached the inductor is reconnected to the input, but with a polarity reversed from the first connection, using switches that are complimentary to the switches used in the first half of the cycle. This connection can occur immediately after zero current (or shortly after zero current if the input voltage is less than the output voltage, to allow the capacitor voltage time to ramp back down), giving full utilization of the power transfer capability of the inductor. No resonant reversal is required as in the time period M4 of the Kim converter shown in FIGS. 5 and 6.

The disclosed embodiments are inherently capable of regeneration at any condition of output voltage, power factor, or frequency, so in motor drive or wind power applications, the motor may act as a generator, returning power to the utility lines.

In an AC motor drive implementation, input and output filtering may be as little as line-to-neutral connected capacitors. Since switches losses are very low due to soft switching, the Buck-Boost inductor can be operated at a high inductor frequency (typically 5 to 20 kHz for low voltage drives), allowing for a single, relatively small, and low loss, magnetic device. The current pulse frequency is twice the inductor frequency. This high frequency also allows the input and output filter capacitors to be relatively small with low, high frequency ripple voltage, which in turns allows for small, low loss line reactors.

Input voltage "sags", as are common when other motors are connected across the line, are accommodated by temporarily drawing more current from the input to maintain a constant power draw and output voltage, utilizing the boost capability of this invention, avoiding expensive shutdowns or even loss of toque to the application.

The full filter between the converter and an attached voltage source (utility) or sink (motor, another utility, or load) includes the line capacitance (line-to-line or line-to-neutral, as in Y or Delta), and a series line inductance (or "line reactor"). When driving a motor, the line reactance is just the inductance of the motor. This provides a power filter, AND does important conditioning for the converter.

The preferred converter benefits from having very low impedance voltage sources and sinks at the inputs and outputs. (This is a significant difference from the converter of FIG. 7, which has inductive line reactance at the I/O, not capacitive.) The link inductor current must be able to be very rapidly switched between the link capacitor and the I/O capacitors, and line reactance would prevent that from incurring, and in fact would likely destroy the switches. The physical construction of the converter should preferably be carefully done to minimize all such inductance which may impair link reactance switching.

The line capacitance itself does not have to have any particular value, but for proper operation the change in voltage on the line capacitance while charging or discharging the link inductance should only be a small fraction of the initial voltage, e.g. less than 10%. There are other restraints as well. For a 20 hp, 460 VAC prototype, 80 µF of line-to-neutral capacitance results in only a 1 to 2% ripple voltage. (This large capacitance was chosen in order to get the ripple current within the capacitor's current rating.) Capacitors could be made with lower uF for the same current rating, resulting in smaller, cheaper capacitors, and higher voltage ripple, but this is all that is available right now.

Another important consideration is the resonant frequency formed by the L-C of the line reactance and the line capacitance (the I/O power filter). This frequency must be lower than the link power cycle frequency in order to not have that filter resonant with the voltage ripple on the line capacitance. For the 20 hp 460 VAC prototype example, the link frequency was 10 kHz, so the link power cycle frequency is 20 kHz (2 power cycles per link voltage cycle). Since the resonant frequency of the L-C I/O is lower than 2 kHz, that works well.

So, to summarize, the capacitance needs to be large enough to reasonably stabilize the I/O voltage to allow the link inductor charge/discharge to occur properly, and the L-C resonant frequency needs to be less than twice the link voltage frequency, and generally at least 4 to 10 times lower.

It should also be noted that too much capacitance on a line filter can lead to excess reactive power on the utility connection.

Referring initially to FIG. 1, illustrated is a schematic of a three phase converter 100 as taught by the present application. The converter 100 is connected to first and second power portals 122 and 123. Each of these portals can source or sink power, and each has a port for each phase of the portal. Converter 100 serves to transfer electric power between the portals, and can accommodate a wide range of voltages, current levels, power factors, and frequencies. The first portal can be, for example, a 460 VAC 60 Hz three phase utility connection, while the second portal can be e.g. a three phase induction motor which is to be operated at variable frequency and voltage so as to achieve variable speed operation of said motor. This configuration can also accommodate additional portals on the same inductor, as may be desired to accommodate power transfer to and from other power sources and/or sinks. Some examples of these alternatives are shown in FIGS. 23 and 24, but many others are possible.

The converter 100 includes a first set of electronic switches ($S_{1u}$, $S_{2u}$, $S_{3u}$, $S_{4u}$, $S_{5u}$, and $S_{6u}$) which are connected between a first port 113 of a link inductor 120 and each respective phase (124 through 129) of the input portal. A second set of electronic switches ($S_{11}$, $S_{21}$, $S_{31}$, $S_{41}$, $S_{51}$, and $S_{61}$) are similarly connected between a second port 114 of link inductor 120 and each phase of the output portal. A link capacitor 121 is connected in parallel with the link inductor, forming the link reactance. In this example, each of the switches in the switching array is capable of conducting current and blocking current in both directions, and may be composed of the bi-directional IGBT 201 of FIG. 2b, as shown in U.S. Pat. No. 5,977,569. Many other such bi-directional switch combinations are possible, such as anti-parallel reverse blocking IGBTs 200 of FIG. 2a, or the device configurations of FIGS. 2c and 2d.

Most of these switch combinations contain two independently controlled gates, as shown with all the switches for FIGS. 2a-2d, with each gate controlling current flow in one direction. In the following description, it is assumed that two gate switches are used in each switch, and that the only gate enable in a switch is the gate which controls current in the direction which is desired in the subsequent operation of the switch. Thus, when each switch mentioned below is said to be enabled, said enabling occurs before conduction occurs, since that portion of the switch is reverse biased at the instant of being enabled, and does not conduct until it becomes forward biased as a result of the changing voltage on the parallel pair of inductor and capacitor.

For illustration purposes, assume that power is to be transferred in a full cycle of the inductor/capacitor from the first to the second portal, as is illustrated in FIG. 13. Also assume that, at the instant the power cycle begins as shown in FIG. 9, phases $A_i$ and $B_i$ have the highest line to line voltage of the first (input) portal, link inductor 120 has no current, and link capacitor 121 is charged to the same voltage as exists between phase $A_i$ and $B_i$. The controller FPGA 1500, shown in FIG. 15, now turns on switches $S_{1u}$ and $S_{21}$, whereupon current begins to flow from phases $A_i$ and $B_i$ into link inductor 120, shown as Mode 1 of FIG. 12a. FIG. 13 shows the inductor current and voltage during the power cycle of FIG. 12a-12j, with the Conduction Mode sequence 1300 corresponding to the Conduction Modes of FIGS. 12a-12j. The voltage on the link reactance remains almost constant during each mode interval, varying only by the small amount the phase voltage changes during that interval. After an appropriate current level has been reached, as determined by controller 1500 to achieve the desired level of power transfer and current distribution among the input phases, switch $S_{21}$ is turned off.

Current now circulates, as shown in FIG. 12b, between link inductor 120 and link capacitor 121, which is included in the circuit to slow the rate of voltage change, which in turn greatly reduces the energy dissipated in each switch as it turns off. In very high frequency embodiments of this invention, the capacitor 121 may consist solely of the parasitic capacitance of the inductor and/or other circuit elements.

To continue with the cycle, as shown as Mode 2 of FIG. 12c and FIG. 13, switch $S_{31}$ is next enabled, along with the previously enabled switch $S_{1u}$. As soon as the link reactance voltage drops to just less than the voltage across phases $A_i$ and $C_i$, which are assumed for this example to be at a lower line-to-line voltage than phases $A_i$ and $B_i$, as shown in FIG. 9, switches $S_{1u}$ and $S_{31}$ become forward biased and start to further increase the current flow into the link inductor, and the current into link capacitor temporarily stops. The two "on" switches, $S_{1u}$ and $S_{31}$, are turned off when the desired peak link inductor current is reached, said peak link inductor current determining the maximum energy per cycle that may be transferred to the output. The link inductor and link capacitor then again exchange current, as shown in FIG. 12*b*, with the result that the voltage on the link reactance changes sign, as shown in graph 1301, between modes 2 and 3 of FIG. 13.

Now as shown in FIG. 12*d*, output switches $S_{5u}$ and $S_{61}$ are enabled, and start conducting inductor current into the motor phases $A_o$ and $B_o$, which are assumed in this example to have the lowest line-to-line voltages at the present instance on the motor, as shown in FIG. 10. After a portion of the inductor's energy has been transferred to the load, as determined by the controller, switch $S_{5u}$ is turned off, and $S_{4u}$ is enabled, causing current to flow again into the link capacitor, which increases the link inductor voltage until it becomes slightly greater than the line-to-line voltage of phases $A_o$ and $C_o$, which are assumed in this example to have the highest line-to-line voltages on the motor, as shown in FIG. 10.

As shown in FIG. 12*e*, most of the remaining link inductor energy is then transferred to this phase pair (into the motor), bringing the link inductor current down to a low level. Switches $S_{4u}$ and $S_{61}$ are then turned off, causing the link inductor current again to be shunted into the link capacitor, raising the link reactance voltage to the slightly higher input line-to-line voltage on phases $A_i$ and $B_i$. Any excess link inductor energy is returned to the input. The link inductor current then reverses, and the above described link reactance current/voltage half-cycle repeats, but with switches that are complimentary to the first half-cycle, as is shown in FIGS. 12*f* to 12*j*, and in Conduction Mode sequence 1300, and graphs 1301 and 1302. FIG. 12*g* shows the link reactance current exchange during the inductor's negative current half-cycle, between conduction modes.

FIG. 11 summarizes the line and inductor current waveforms for a few link reactance cycles at and around the cycle of FIGS. 12 and 13.

Note that TWO power cycles occur during each link reactance cycle. In FIGS. 12*a*-12*j*, power is pumped IN during modes 1 and 2, extracted OUT during modes 3 and 4, IN again during modes 5 and 6, and OUT again during modes 7 and 8. The use of multi-leg drive produces eight modes rather than four, but even if polyphase input and/or output is not used, the presence of TWO successive in and out cycles during one cycle of the inductor current is notable.

As shown in FIGS. 12*a*-12*j* and FIG. 13, Conduction Mode sequence 1300, and in graphs 1301 and 1302, the link reactance continues to alternate between being connected to appropriate phase pairs and not connected at all, with current and power transfer occurring while connected, and voltage ramping between phases while disconnected (as occurs between the closely spaced dashed vertical lines of which 1303 in FIG. 13 is one example).

In general, when the controller 1500 deems it necessary, each switch is enabled, as is known in the art, by raising the voltage of the gate 204 on switch 200 (shown in FIG. 2*a*) above the corresponding terminal 205, as an example. Furthermore, each switch is enabled (in the preferred two gate version of the switch) while the portion of the switch that is being enabled is zero or reverse biased, such that the switch does not start conduction until the changing link reactance voltage causes the switch to become forward biased. Single gate AC switches may be used, as with a one-way switch embedded in a four diode bridge rectifier, but achieving zero-voltage turn on is difficult, and conduction losses are higher.

In FIG. 15, current through the inductor is sensed by sensor 1510, and the FPGA 1500 integrates current flows to determine the current flowing in each phase (port) of the input and output portals. Phase voltage sensing circuits 1511 and 1512 allow the FPGA 1500 to control which switches to enable next, and when.

By contrast, note that the prior art structure of FIG. 8 has four bi-directional switches on the input, and two on the output, with a link inductor (no parallel capacitor) in between. That configuration is a hard switched buck-boost, and, like all prior buck-boost converters, it has only 1 power transfer per link inductor cycle. Moreover, the link inductor has a DC current component, unlike the converter of FIG. 1 (which has NO average DC current, only AC).

FIG. 14 illustrates inductor current and voltage waveforms when the converter of FIG. 1 is operating with reduced output voltage. Link inductor 120 current from the input increases during modes 1 and 2 to a maximum level as for the full output voltage case of FIG. 13, but since the output voltage is half as high as for the full output voltage case, link inductor current decreases only half as quickly while discharging to the output phases in modes 3 and 4. This will generally supply the required output current before the link inductor current has fallen to zero or even near zero, such that there is a significant amount of energy left in the link inductor at the end of mode 4 in FIG. 14. This excess energy is returned to the input in mode 5 and 1. Mode 1 in FIG. 14 begins prior to the vertical axis. It can be seen that with zero output voltage, the current during modes 3 and 4 (and 7 and 8) will not decrease at all, so that all link inductor energy is returned to the input, allowing for the delivery of output current but with no power transfer, as is required for current delivered at zero volts.

The Kim converter cannot return this excessive inductor energy back to the input, as this requires bidirectional switches. Thus the Kim converter must wait until the inductor energy drops to a sufficiently low value, with the result that the link reactance frequency drops to a very low value as the output voltage approaches zero. This in turn can cause resonances with input and/or output filters. With zero voltage output, the Kim converter cannot function at all.

Note that the modes cited in Kim et al. differ somewhat from the modes cited here. This is due to two reasons. The first is that, for brevity, the "capacitor ramping", or "partial resonant" periods in this invention are not all numbered, as there are 8 of those periods. As indicated in FIGS. 12*b* and 12*g*, voltage ramping periods preferably occur between each successive pair of conduction modes. The second reason is that Kim et al. operate their converter such that it draws current from one input phase pair per power cycle, and likewise delivers current to one phase pair per power cycle. This results in only two conduction modes per link reactance cycle, since their converter only has one power cycle per link reactance cycle. By contrast, FIG. 12 shows current being drawn and delivered to both pairs of input and output phases, resulting in 4 modes for each direction of link inductor current during a power cycle, for a total of 8 conduction modes since there are two power cycles per link reactance cycle in the preferred embodiment. This distinction is not dependent on the topology, as either three phase converter may be operated in either 2 modes or 4 conduction modes per power cycle, but the preferred method of operation is with 4 conduction modes per power cycle, as that minimizes input and output harmonics. For single phase AC or DC, it is preferred to have only two conduction modes per power cycle, or four modes per link reactance cycle, as there is only one input and output pair in that case. For mixed situations, as in the embodiment of FIG. 24 which converts between DC or single phase AC and three phase AC, there may be 1 conduction mode for the DC interface, and 2 for the three phase AC, for 3 conduction modes per power cycle, or 6 modes per link reactance cycle. In any case, however, the two conduction modes per power half-cycle for three phase operation together give a similar power transfer effect as the singe conduction mode for single phase AC or DC.

Control algorithms may use this ability of recycling inductor energy to advantage in order to control current transfers, as is required by many converter control algorithms for vector or volts/Hz control. One such possible algorithm is explained in FIGS. 16 through 20. FIGS. 16, 17, and 20 show possible current profiles for the link inductor during a power cycle of positive current. This is for the case of only two conduction modes per power cycle, as this invention uses for single phase AC or DC. The power cycle for negative inductor current is the mirror image of the cycles shown, as there are two power cycles per inductor cycle. Timing intervals T1, T2, T3, Tr1, and Tr2 are shown. T1 is the time for the first conduction mode, when current is increasing from the input. T2 is the second conduction mode, in which the inductor is connected to the output, either decreasing in current for power transfer to the output (positive power) as in FIGS. 16 and 17, or increasing in current for power transfer from the output (negative power) as in FIG. 20. T3 is the actually the first part of conduction mode 1 in which excess link inductor energy is either returned to the input during positive power or delivered from output to input during negative power. Tr1 and Tr2 are the "partial resonant", or "capacitor ramping" times during which all switches are off and the voltage on the link reactance is ramping. For three phase operation, intervals T1 and T2 are sub-divided, with T1 consisting of two conduction modes for the two input phase pairs from which current is drawn, and likewise for T2 for delivery of current to the output phases. The relative times and inductor current levels determine the charge and therefore the relative current levels among the phases. For three phase operation with zero or near-zero power factor, T2 may subdivided into negative and positive energy transfer periods. Note that similar durations are used for ramping the converter in BOTH directions. However, the ramping durations can be different between input and output phases, as load draw varies due to extrinsic circumstances. The charge time from the input can be held constant, with the discharge time to the output varied to vary average output current (see FIG. 19). Excess link inductor energy (current) is returned to the input in T3. But all charge times and transitions on the link reactance are perfectly symmetric about the zero points of voltage and current (see FIG. 13).

For the single phase AC and DC operation of FIGS. 16 through 20, the average output current is given by the equation at the bottom of FIGS. 16, 17, and 20, with the "Charge over T2" given by the integral of the link inductor current over the time interval of T2. For positive power, the peak link inductor current I1 may be held constant, while T2 is varied to control average output current (Iavg-out). An algorithm to calculate Iavg-out is shown in FIG. 18. For a given set of circuit parameters and input and output voltages, T2 (first column in FIG. 18) may be varied to control Iavg-out (6.sup.th column). Resulting other time intervals and power levels are also calculated. AN input voltage of 650 volts and an output voltage of 600 volts is used in FIG. 19. FIG. 19 shows the results of the algorithm for other output voltages, with the 650 volts input, as a function of T2, in micro-seconds (uS). An average (filtered) output current level of 26 amps is shown for the 650 volt output curve with a T2 of 27 uS, for a power output of 16.8 kW. Note that the link reactance frequency remains constant at 10 kHz for the 650 volt output curve, regardless of T2 and Iavg-out. For the other curves, with lower output voltage, frequency drops for lower output voltage, but never drops below 5 kHz even for zero output volts. Also note that Iavg-out for 0 volts goes to 55 amps for T2 of 50 μS, which is more than double Iavg-out at maximum power, even though maximum inductor current remains constant at 110 amps. For lower converter losses when lower output currents are commanded, the controller 1500 may be programmed to reduce T1, thereby reducing the peak inductor current.

FIG. 19 also shows some specific drive parameters for the example 460 VAC, 20 hp drive. The link inductor is 140 μH, and may be constructed as an air core copper wound inductor, with thin, flat, ribbon wire so as to have a low ratio of AC to DC resistance from the skin effect, and wound like a roll of tape. This configuration optimizes the inductance to resistance ratio of the inductor, and results in relatively high parasitic capacitance. Such a design cannot be used by hard switched converters, as this high parasitic capacitance causes high losses, but with this invention the high parasitic capacitance is a benefit. The ramp, or parallel, link capacitance is comprised of two parallel AVX (FSV26B0104K-) 0.1 μF film capacitors capable of handling the RMS current load of about 25 amps. Peak inductor current is 110 amps. Commercially available reverse-blocking IGBT switches, IXYS part 40N120 55 A, 1200 V, arranged in anti-parallel pairs may be used. In a standard hard switched application, such as a current source drive, this switch has relatively high turn-on and reverse recovery losses caused by the slow reverse recovery time of the device, but when used in this invention, both turn-on and reverse recovery losses are negligible even at a per device maximum switching frequency of 10 kHz and 110 amps peak current. High RMS current capacitors from AVX (FFV3410406K), totaling 80 μF line-to-neutral, may be used for the input and output capacitors. The Altera Cyclone III FPGA may be used for the controller, implementing the algorithms described above to control current flow, and using either vector or Volts/Hz to control a 20 HP motor. Isolated power supplies, gate drivers, and digital isolators allow the FPGA to control the on-off states of the IGBTs. Voltage and current sensing circuits, with analog-digital interfaces to the FPGA, allow for precise switch timing to control current flow.

As may be surmised by those skilled in the art, the current resulting from the above described operation of the converter is, in many applications, controlled by controller 1500 to result in a sinusoidal varying current from the input, normally in phase with the input voltage so as to produce a unity power factor on the input, and sinusoidally varying voltage and current on the motor, so as to operate the motor at the highest possible efficiency and/or performance.

In those cases where the motor is acting as a generator, as may occur when the frequency applied to the motor via the converter is rapidly decreased, the above described operating cycle is reversed, with current being drawn from the motor phases and injected into the input phases.

In general, the input and output frequencies are substantially less than the frequency at which the link reactance is operated. For 60 Hz input, a typical operating frequency of the link reactance may be 10 kHz for low voltage (230 to 690 VAC) drives and converters, and 1.5 kHz for medium voltage (2300 on up) drives and converters, with current pulse frequencies twice those frequencies, or higher if multiple, synchronized power modules are used, as shown in FIG. 28.

Input and Output frequencies may vary from zero (DC) to over well over 60 Hz, and may even be up to 20 kHz in audio amplifier applications.

Another embodiment is shown in FIG. 21, which shows a single phase AC or DC to single phase AC to DC converter. Either or both input and output may be AC or DC, with no restrictions on the relative voltages. If a portal is DC and may only have power flow either into or out of said portal, the switches applied to said portal may be uni-directional. An example of this is shown with the photovoltaic array of FIG. 23, which can only source power.

FIG. 22 shows another inventive embodiment, in a Flyback Converter. Here the circuit of FIG. 21 has been modified, in that the link inductor is replaced with a transformer 2200 that has a magnetizing inductance that functions as the link inductor. Any embodiment of this invention may use such a transformer, which may be useful to provide full electrical isolation between portals, and/or to provide voltage and current translation between portals, as is advantageous, for example, when a first portal is a low voltage DC battery bank, and a second portal is 120 volts AC, or when the converter is used as an active transformer.

In the embodiments of this invention shown in FIGS. 23 and 24, the number of portals attached to the link reactance is more than two, simply by using more switches to connect in additional portals to the inductor. As applied in the solar power system of FIG. 23, this allows a single converter to direct power flow as needed between the portals, regardless of their polarity or magnitude. Thus, the solar photovoltaic array may be at full power, 400 volts output, and delivering 50% of its power to the battery bank at 320 volts, and the 50% to the house AC at 230 VAC. Prior art requires at least two converters to handle this situation, such as a DC-DC converter to transfer power from the solar PV array to the batteries, and a separate DC-AC converter (inverter) to transfer power from the battery bank to the house, with consequential higher cost and electrical losses. The switches shown attached to the photovoltaic power source need be only one-way since the source is DC and power can only flow out of the source, not in and out as with the battery.

In the power converter of FIG. 24, as could be used for a hybrid electric vehicle, a first portal is the vehicle's battery bank, a second portal is a variable voltage, variable speed generator run by the vehicle's engine, and a third portal is a motor for driving the wheels of the vehicle. A fourth portal, not shown, could be external single phase 230 VAC to charge the battery. Using this single converter, power may be exchanged in any direction among the various portals. For example, the motor/generator may be at full output power, with 50% of its power going to the battery, and 50% going to the wheel motor. Then the driver may depress the accelerator, at which time all of the generator power may be instantly applied to the wheel motor. Conversely, if the vehicle is braking, the full wheel motor power may be injected into the battery bank, with all of these modes using a single converter.

FIGS. 25 and 26 show half-bridge converter embodiments of this invention for single phase/DC and three phase AC applications, respectively. The half-bridge embodiment requires only 50% as many switches, but results in 50% of the power transfer capability, and gives a ripple current in the input and output filters which is about double that of the full bridge implementations for a given power level.

FIG. 27 shows a sample embodiment as a single phase to three phase synchronous motor drive, as may be used for driving a household air-conditioner compressor at variable speed, with unity power factor and low harmonics input. Delivered power is pulsating at twice the input power frequency.

FIG. 28 shows a sample embodiment with dual, parallel power modules, with each module constructed as per the converter of FIG. 1, excluding the I/O filtering. This arrangement may be advantageously used whenever the converter drive requirements exceed that obtainable from a singe power module and/or when redundancy is desired for reliability reasons and/or to reduce I/O filter size, so as to reduce costs, losses, and to increase available bandwidth. The power modules are best operated in a manner similar to multi-phase DC power supplies such that the link reactance frequencies are identical and the current pulses drawn and supplied to the input/output filters from each module are uniformly spaced in time. This provides for a more uniform current draw and supply, which may greatly reduce the per unit filtering requirement for the converter. For example, going from one to two power modules, operated with a phase difference of 90 degrees referenced to each of the modules inductor/capacitor, produces a similar RMS current in the I/O filter capacitors, while doubling the ripple frequency on those capacitors. This allows the same I/O filter capacitors to be used, but for twice the total power, so the per unit I/O filter capacitance is reduced by a factor 2. More importantly, since the ripple voltage is reduced by a factor of 2, and the frequency doubled, the input line reactance requirement is reduced by 4, allowing the total line reactor mass to drop by 2, thereby reducing per unit line reactance requirement by a factor of 4.

FIG. 29 shows an embodiment as a three phase Power Line Conditioner, in which role it may act as an Active Filter and/or supply or absorb reactive power to control the power factor on the utility lines. If a battery, with series inductor to smooth current flow, is placed in parallel with the output capacitor 2901, the converter may then operate as an Uninterruptible Power Supply (UPS).

According to some (but not necessarily all) disclosed embodiments, there is provided: A Buck-Boost Converter, comprising: an energy-transfer reactance; first and second power portals, each with two or more ports by which electrical power is input from or output to said portals; first and second bridge switch arrays interposed between said reactance and respective ones of said portals, and each comprising one bidirectional switching device for each said port of each said power portal; an an energy storage capacitor, reversibly connected across said reactance through a bridge configuration.

According to some (but not necessarily all) disclosed embodiments, there is provided: A Buck-Boost Converter, comprising: an energy-transfer reactance; a first bridge switch array comprising at least two bidirectional switching devices which are jointly connected to operatively connect at least one terminal of said reactance to a power input, with reversible polarity of connection; a second bridge switch array comprising at least two bidirectional switching devices which are jointly connected to operatively connect at least one terminal of said reactance to a power output, with reversible polarity of connection; and an energy storage capacitor, reversibly connected across said reactance through a full-bridge configuration; wherein said first switch array drives said reactance with a nonsinusoidal voltage waveform.

According to some (but not necessarily all) disclosed embodiments, there is provided: A Full-Bridge Buck-Boost Converter, comprising: first and second full bridge switch arrays, each comprising at least four bidirectional switching devices; a substantially parallel inductor-capacitor combination symmetrically connected to be driven separately by either said switch array; and an energy storage capacitor, reversibly connected across said reactance through a full-bridge configuration; one of said switch arrays being operatively connected to a power input, and the other thereof being operatively connected to supply a power output.

According to some (but not necessarily all) disclosed embodiments, there is provided: A Buck-Boost Converter, comprising: first and second switch arrays, each comprising at least two bidirectional switching devices; a substantially parallel inductor-capacitor combination connected to each said switch array; and an energy storage capacitor, reversibly connected across said reactance through a full-bridge configuration; wherein a first one of said switch arrays is operatively connected to a power input, and is operated to drive power into said inductor-capacitor combination with a non-sinusoidal waveform; and wherein a second one of said switch arrays is operated to extract power from said inductor-capacitor combination to an output.

According to some (but not necessarily all) disclosed embodiments, there is provided: A power conversion circuit, comprising: an input stage which repeatedly, at various times, drives current into the parallel combination of an inductor and a capacitor, and immediately thereafter temporarily disconnects said parallel combination from external connections, to thereby transfer some energy from said inductor to said capacitor; wherein said action of driving current is performed in opposite senses at various times, and wherein said disconnecting operation is performed substantially identically for both directions of said step of driving current; an energy storage capacitor, reversibly connected across said reactance through a full-bridge configuration; and an output stage which extracts energy from said parallel combination, to thereby perform power conversion.

According to some (but not necessarily all) disclosed embodiments, there is provided: A method for operating a Buck-Boost Converter, comprising the actions of: (a) operating a first bridge switch array, comprising bidirectional switching devices, to operatively connect at least one terminal of a reactance to a power input, with polarity which reverses at different times; (b) operating a second bridge switch array, comprising bidirectional switching devices, to operatively connect at least one terminal of said reactance to a power output, with polarity which reverses at different times; (c) operating an H-bridge switch subarray to operatively connect an energy storage capacitor to said reactance at various times, with polarity which reverses at various times, to provide net energy transfer into and out of said energy storage capacitor; and wherein said actions (a) and (b) are not performed simultaneously.

According to some (but not necessarily all) disclosed embodiments, there are provided: Methods and systems for power conversion. An energy storage capacitor is contained within an H-bridge subcircuit which allows the capacitor to be connected to the link inductor of a Universal Power Converter with reversible polarity. This provides a "pseudo-phase" drive capability which expands the capabilities of the converter to compensate for zero-crossings in a single-phase power supply.

Modifications and Variations

As will be recognized by those skilled in the art, the innovative concepts described in the present application can be modified and varied over a tremendous range of applications, and accordingly the scope of patented subject matter is not limited by any of the specific exemplary teachings given. It is intended to embrace all such alternatives, modifications and variations that fall within the spirit and broad scope of the appended claims.

The sizing of ESC is independent of the sizing of the link inductor. Typically 25% to about 50% of total energy transferred goes through the ESC, but this percentage can vary significantly depending on the application.

In general it is only necessary to have one energy storage capacitor in the circuit. However, it is also possible (less preferably) to have more than one energy storage capacitor.

In a multiport system, it is usually most efficient to locate the energy-storage capacitor on the highest-voltage port of the system. However, this can be varied.

None of the description in the present application should be read as implying that any particular element, step, or function is an essential element which must be included in the claim scope: THE SCOPE OF PATENTED SUBJECT MATTER IS DEFINED ONLY BY THE ALLOWED CLAIMS. Moreover, none of these claims are intended to invoke paragraph six of 35 USC section 112 unless the exact words "means for" are followed by a participle.

The claims as filed are intended to be as comprehensive as possible, and NO subject matter is intentionally relinquished, dedicated, or abandoned.

What is claimed is:

1. A Buck-Boost Converter, comprising:
   an energy-transfer reactance;
   first and second power portals, each with two or more ports by which electrical power is input from or output to said portals;
   first and second bridge switch arrays interposed between said reactance and respective ones of said portals, and each comprising one bidirectional switching device for each said port of each said power portal; and
   an energy storage capacitor, reversibly connected across said reactance through a full-bridge configuration.

2. The converter of claim 1, wherein said bridge arrays are symmetrically connected to said energy-transfer reactance.

3. The converter of claim 1, wherein said bridge arrays are full-bridge arrays.

4. The converter of claim 1, further comprising a third switch array, which is connected to said reactance in parallel with said first and second switch arrays.

5. The converter of claim 1, wherein each said portal is shunted by a capacitor which provides a low-impedance voltage source thereat.

6. The converter of claim 1, wherein said reactance comprises a transformer.

7. The converter of claim 1, wherein said reactance comprises a parallel combination of an inductor with a capacitor.

8. The converter of claim 1, wherein said reactance is driven at a base frequency which is less than half its resonant frequency.

9. A Buck-Boost Converter, comprising:
   an energy-transfer reactance;
   a first bridge switch array comprising at least two bidirectional switching devices which are jointly connected to operatively connect at least one terminal of said reactance to a power input, with reversible polarity of connection;
   a second bridge switch array comprising at least two bidirectional switching devices which are jointly connected to operatively connect at least one terminal of said reactance to a power output, with reversible polarity of connection; and
   an energy storage capacitor, reversibly connected across said reactance through a full-bridge configuration;

wherein said first switch array drives said reactance with a nonsinusoidal voltage waveform.

10. The converter of claim 9, wherein said bridge arrays are symmetrically connected to said energy-transfer reactance.

11. The converter of claim 9, wherein said bridge arrays are full-bridge arrays.

12. The converter of claim 9, further comprising a third switch array, which is connected to said reactance in parallel with said first and second switch arrays.

13. The converter of claim 9, wherein said input is shunted by a capacitor which provides a low-impedance voltage source thereat.

14. The converter of claim 9, wherein said input and output are both shunted by respective capacitors which provide low-impedance voltage sources thereat.

15. The converter of claim 9, wherein said reactance comprises a transformer.

16. The converter of claim 9, wherein said reactance comprises a parallel combination of an inductor with a capacitor.

17. The converter of claim 9, wherein said reactance is driven at a base frequency which is less than half its resonant frequency.

18. The converter of claim 9, wherein said bridge arrays are symmetrically connected to said energy-transfer reactance.

19. A Full-Bridge Buck-Boost Converter, comprising:
first and second full bridge switch arrays, each comprising at least four bidirectional switching devices;
a substantially parallel inductor-capacitor combination symmetrically connected to be driven separately by either said switch array; and
an energy storage capacitor, reversibly connected across said reactance through a full-bridge configuration;
one of said switch arrays being operatively connected to a power input, and the other thereof being operatively connected to supply a power output.

20. The converter of claim 19, wherein said power input is shunted by a capacitor which provides a low-impedance voltage source thereat.

\* \* \* \* \*